US009984372B1

(12) United States Patent
Elrod et al.

(10) Patent No.: US 9,984,372 B1
(45) Date of Patent: May 29, 2018

(54) METHOD OF PREPAID CARD PARTIAL PAYMENT TRANSACTION AUTHORIZATION

(71) Applicant: Vindicia, Inc., Redwood City, CA (US)

(72) Inventors: Mark Elrod, San Carlos, CA (US); Gene Hoffman, Emerald Hills, CA (US); Rima Toubassy, Belmont, CA (US)

(73) Assignee: VINDICIA, INC., Redwood City, CA (US)

( * ) Notice: Subject to any disclaimer, the term of this patent is extended or adjusted under 35 U.S.C. 154(b) by 514 days.

(21) Appl. No.: 14/588,263

(22) Filed: Dec. 31, 2014

Related U.S. Application Data

(63) Continuation-in-part of application No. 13/672,611, filed on Nov. 8, 2012.

(60) Provisional application No. 61/922,667, filed on Dec. 31, 2013, provisional application No. 61/557,195, filed on Nov. 8, 2011.

(51) Int. Cl.
  *G06Q 20/40* (2012.01)
  *G06Q 20/38* (2012.01)

(52) U.S. Cl.
  CPC ......... *G06Q 20/405* (2013.01); *G06Q 20/385* (2013.01)

(58) Field of Classification Search
  CPC .............................. G06C 20/405; G06C 20/385
  See application file for complete search history.

(56) References Cited

U.S. PATENT DOCUMENTS

| 8,403,211 | B2* | 3/2013 | Brooks | G06Q 20/20 235/375 |
| 8,636,203 | B1* | 1/2014 | Patterson | G06Q 20/12 235/379 |
| 8,820,633 | B2* | 9/2014 | Bishop | G06Q 20/02 235/379 |
| 9,245,267 | B2* | 1/2016 | Singh | G06Q 20/10 |
| 2006/0044392 | A1 | 4/2006 | Kawada et al. | |

(Continued)

FOREIGN PATENT DOCUMENTS

| KR | 10-2008-0022844 A | 3/2008 |
| WO | 2006-044392 A2 | 4/2006 |

OTHER PUBLICATIONS

Canner, Glenn B.; Luckett, Charles A.; Developments in the Pricing of Credit Card Services, 1992, Federal Reserve Bulletin, p. 652 (Year: 1992).*

(Continued)

*Primary Examiner* — William E Rankins
*Assistant Examiner* — Leonard Raykinsteen
(74) *Attorney, Agent, or Firm* — Zilka-Kotab, PC

(57) ABSTRACT

A payment processing system allows partial captures and full deposits after receiving a partial authorization result on a requested card transaction. When the partial amount authorized is less than the full transaction amount, but above a certain value (which can be merchant specified), the system can accept the partial amount (a partial deposit or partial capture) as payment for the transaction. When the partial amount authorized is less than the full transaction amount, and below a certain value (which can be merchant specified), the system can make a full deposit of the transaction amount. The system can use one or more factors, including historical information, in determining whether to attempt a full deposit.

3 Claims, 19 Drawing Sheets

(56) References Cited

U.S. PATENT DOCUMENTS

| | | | |
|---|---|---|---|
| 2008/0162295 A1* | 7/2008 | Bedier | G06Q 20/04 |
| | | | 705/26.1 |
| 2009/0157518 A1 | 6/2009 | Bishop et al. | |
| 2009/0157519 A1* | 6/2009 | Bishop | G06Q 20/02 |
| | | | 705/19 |
| 2009/0265249 A1 | 10/2009 | Bishop et al. | |
| 2009/0265250 A1 | 10/2009 | Bishop et al. | |
| 2009/0271278 A1* | 10/2009 | Bishop | G06Q 20/02 |
| | | | 705/21 |
| 2011/0082737 A1* | 4/2011 | Crowe | G06Q 30/02 |
| | | | 705/14.27 |
| 2012/0101930 A1 | 4/2012 | Li et al. | |
| 2012/0143722 A1 | 6/2012 | John | |
| 2012/0150671 A1 | 6/2012 | Mercia et al. | |
| 2012/0221468 A1 | 8/2012 | Kumnick et al. | |
| 2013/0024289 A1* | 1/2013 | Cueli | G06Q 20/027 |
| | | | 705/14.65 |
| 2013/0325710 A1* | 12/2013 | Hoshing | G06Q 20/102 |
| | | | 705/40 |

OTHER PUBLICATIONS

Card Acceptance Guidelines for Visa Merchants, Oct. 19, 2015, Visa USA, https://usa.visa.com/dam/VCOM/download/merchants/card-acceptance-guidelines-for-merchants.pdf (Year: 2015).*

* cited by examiner

METHOD OF PREPAID CARD PARTIAL PAYMENT TRANSACTION AUTHORIZATION

CROSS-REFERENCE TO RELATED APPLICATIONS

This application claims the benefit of U.S. patent application 61/922,667, filed Dec. 31, 2013, and is a continuation-in-part of U.S. patent application Ser. No. 13/672,611, filed Nov. 8, 2012, which claims the benefit of U.S. patent application 61/557,195, filed Nov. 8, 2011. These applications are incorporated by reference along with all other references cited in this application.

BACKGROUND OF THE INVENTION

This invention relates to field of payment processing, and more specifically to a system of processing partial authorizations, partial deposits, and full deposits. The system provided as a software as a service (SaaS) billing solution.

In the payment industry, increasing the average success rate of both real-time or initial transactions and subscription or recurring transactions (which are also known as forced deposits) is important. Certain merchant processing entities allow sophisticated subscription businesses to override the denial of an authorization from the issuing bank for a given transaction if that transaction was in certain reason codes.

This can occur for attempted transactions where the account was over their credit limit. A drawback of this approach is that some debit and credit issuing banks consider the practice unfriendly to their cardholders and the issuing banks would then issue chargebacks for any transaction deposited in this manner. As subscription or recurring and virtual goods merchants tend to have a chargeback rate close to the 1 percent of transactions ceiling set by the card associations, it is difficult for a merchant to run the risk of additional chargebacks generated by these deposits while remain below 1 percent of monthly transactions becoming chargebacks.

With the rise of card association branded stored value cards, the card networks have added new functionality to the payment networks to support these new card types. An added functionality is called partial authorizations. The payment network supports allowing consumers use the remaining balance on a prepaid or stored value card even if the consumers were unsure of the remaining balance.

Partial authorizations are typically handled: when a consumer attempts to use a prepaid card either in a store or online, the merchant would receive a middle response between authorized and not authorized when that card account would not fully authorize for the total amount requested but would authorize for a lesser amount. The merchant can use this partial authorization data to then inform the consumer that some portion of the check out cost can be placed upon the prepaid card and inform the consumer how much more would have to be presented using another card or payment instrument. This allowed the prepaid card to be fully used up.

As the payment industry continues to evolve and features such as partial authorizations and others become available, there is need for improvements in payment processing and the software for such processing to increase the success rate and payment flow for transactions.

BRIEF SUMMARY OF THE INVENTION

A payment processing system allows partial captures and full deposits after receiving a partial authorization result on a requested card transaction. When the partial amount authorized is less than the full transaction amount, but above a certain value (which can be merchant specified), the system can accept the partial amount (a partial deposit or partial capture) as payment for the transaction. When the partial amount authorized is less than the full transaction amount, and below a certain value (which can be merchant specified), the system can make a full deposit of the transaction amount. The system can use one or more factors, including historical information, in determining whether to attempt a full deposit.

The system can increase customer lifetime value by offering the right products and minimizing payment failures; recover lost revenue with built-in fraud screening and chargeback management; enable global transaction support through multiple processors, payment methods, currencies, and languages; allow merchants to fully own their customer relationship, customer experience and customer data; support pre- and postpaid business models that enable both automatic payments and traditional invoicing; shorten time-to-market by enabling business users to easily manage product configurations, pricing plans, customer notifications and even account information via an online portal interface; make better business decisions and understand key trends with detailed dashboards, reporting and analytic capabilities; and fully eliminate PCI DSS compliance burden by offloading storage and processing of payment information to the billing platform.

An implementation of a billing platform is CashBox by Vindicia. CashBox is a SaaS billing solution with integrated marketing best practices to optimize customer retention, enhance acquisition rates, and minimize operational overhead. With CashBox, merchants selling digital content and services can take control of their business with detailed analytics and best practices to grow revenue.

CashBox is for merchants who want to: sell any form of digital content or services: software, SaaS, online gaming, dating, media, and online content; rapidly launch new products with business model flexibility; create or enhance their existing revenue streams and strengthen customer loyalty by billing by time, usage, automated invoicing, microtransactions, prorated, hierarchical, or subscriptions; expand globally with new payment methods, currencies and support for regional tax regimes; fight both the true and friendly fraud that exists in card-not-present environments and manage their overall chargeback rate; test and have more control over marketing campaigns and affiliate channels; and offload compliance with stringent PCI DSS requirements.

In an implementation, a method includes: receiving a payment request from a merchant for a payment using a payment card, where the payment request includes a payment amount being charged; sending an authorization request to the payment processor for the payment amount; receiving a partial authorization for an authorized amount which is less than the payment amount; using at least one electronic processor (e.g., CPU) to determine if the authorized amount is greater than an X percent of the payment amount; when the authorized amount is greater than the X percent of the payment amount, making a deposit request on behalf of the merchant for the authorized amount, where X is less than 100; and when the authorized amount is less than the X percent of the payment amount, making a deposit request for the merchant for the payment amount.

In various implementations, the method can include providing a graphical user interface screen for the merchant to specify the X percent. At least one electronic processor is used to determine if the authorized amount is greater than a Y percent of the payment amount, where the Y percent is less than the X percent. When the authorized amount is less than the Y percent of the payment amount, a deposit request is not made for the merchant for the payment amount. The method can include providing a graphical user interface screen for the merchant to specify the Y percent.

The method can include: when receiving a partial authorization for an authorized amount which is equal to the payment amount, making a deposit request for the merchant for the payment amount. The method can include: when a deposit request for the authorized amount is not made and a deposit of the payment amount is not made, checking an identifier of the payment card against a database, checking the identifier of the payment card against a bad BIN list, and checking the identifier of the payment card against a chargeback list.

When the identifier of the payment card is in the database, a deposit request is made for the merchant for the payment amount. When the identifier of the payment card is in the bad BIN list, a deposit request is not made for the merchant for the payment amount.

When a deposit request for the authorized amount is not made and a deposit of the payment amount is not made, a history of the identifier of the payment card is checked. Based on the history, a deposit request can be made for the merchant for the payment amount. Based on the history, a deposit request can also not be made for the merchant for the payment amount.

In another implementation, a method includes: receiving a payment request from a merchant for a payment using a payment card, where the payment request includes a payment amount being charged; sending an authorization request to the payment processor for the payment amount; after receiving a partial authorization for an authorized amount which is equal to the payment amount, making a deposit request for the merchant for the payment amount; receiving a partial authorization for an authorized amount which is less than the payment amount; using at least one electronic processor to determine if the authorized amount is greater than an X percent of the payment amount; when the authorized amount is greater than the X percent of the payment amount, making a deposit request on behalf of the merchant for the authorized amount, where X is less than 100, where the deposit request is used to satisfy payment in full for the payment amount.

The method can include: when the authorized amount is less than the X percent of the payment amount, making a first check of a history of the payment card; making a second check of an identifier of the payment card against a database, making a third check of the identifier of the payment card against a bad BIN list, and making a fourth check of the identifier of the payment card against a chargeback list; and based on first, second, third, and fourth checks passing, making a deposit request for the merchant for the payment amount.

The method can include: based on any one or more of the first, second, third, and fourth checks not passing, not making a deposit request for the merchant for the payment amount.

The database can be any one or more of a blacklist, grey list, or white list. The method can includes: using at least one electronic processor to determine a chargeback rate for the merchant; and when the chargeback rate is higher than a threshold value, not making a deposit request for the merchant for the payment amount.

Other objects, features, and advantages of the present invention will become apparent upon consideration of the following detailed description and the accompanying drawings, in which like reference designations represent like features throughout the figures.

DETAILED DESCRIPTION OF THE INVENTION

Figure 1:
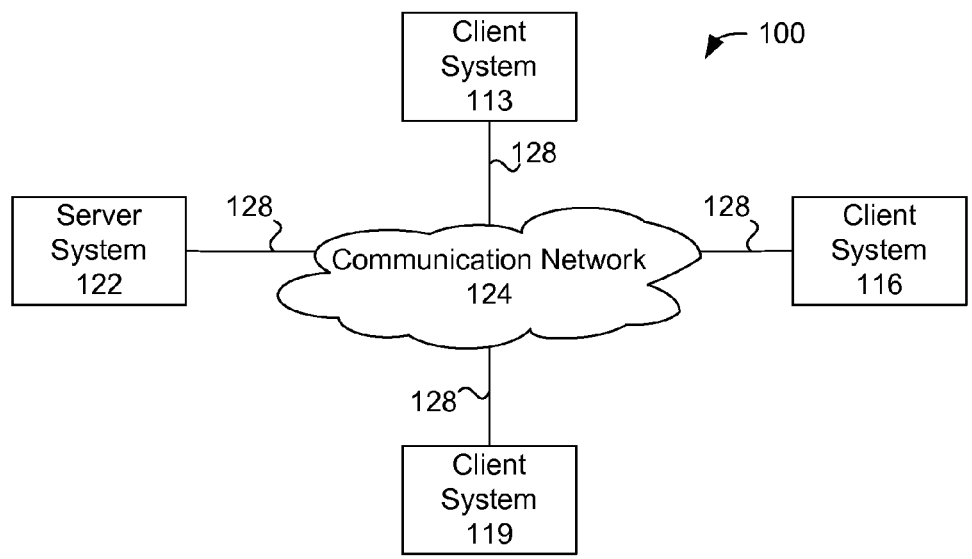
FIG. 1 shows a client-server system and network.

FIG. 1 is a simplified block diagram of a distributed computer network 100 incorporating an embodiment of the present invention. Computer network 100 includes a number of client systems 113, 116, and 119, and a server system 122 coupled to a communication network 124 via a plurality of communication links 128. Communication network 124 provides a mechanism for allowing the various components of distributed network 100 to communicate and exchange information with each other.

Communication network 124 may itself be comprised of many interconnected computer systems and communication links. Communication links 128 may be hardwire links, optical links, satellite or other wireless communications links, wave propagation links, or any other mechanisms for communication of information. Various communication protocols may be used to facilitate communication between the various systems shown in FIG. 1. These communication protocols may include TCP/IP, HTTP protocols, wireless application protocol (WAP), vendor-specific protocols, customized protocols, and others. While in one embodiment, communication network 124 is the Internet, in other embodiments, communication network 124 may be any suitable communication network including a local area network (LAN), a wide area network (WAN), a wireless network, a intranet, a private network, a public network, a switched network, and combinations of these, and the like.

Distributed computer network 100 in FIG. 1 is merely illustrative of an embodiment incorporating the present invention and does not limit the scope of the invention as recited in the claims. One of ordinary skill in the art would recognize other variations, modifications, and alternatives. For example, more than one server system 122 may be connected to communication network 124. As another example, a number of client systems 113, 116, and 119 may be coupled to communication network 124 via an access provider (not shown) or via some other server system.

Client systems 113, 116, and 119 typically request information from a server system which provides the information. For this reason, server systems typically have more computing and storage capacity than client systems. However, a particular computer system may act as both as a client or a server depending on whether the computer system is requesting or providing information. Additionally, although aspects of the invention has been described using a client-server environment, it should be apparent that the invention may also be embodied in a stand-alone computer system.

Server 122 is responsible for receiving information requests from client systems 113, 116, and 119, performing processing required to satisfy the requests, and for forwarding the results corresponding to the requests back to the requesting client system. The processing required to satisfy the request may be performed by server system 122 or may alternatively be delegated to other servers connected to communication network 124.

According to the teachings of the present invention, client systems 113, 116, and 119 enable users to access and query information stored by server system 122. In a specific embodiment, a "web browser" application executing on a client system enables users to select, access, retrieve, or query information stored by server system 122. Examples of web browsers include the Internet Explorer browser program provided by Microsoft Corporation, and the Firefox browser provided by Mozilla, and others. In some implementations, the software can be a standalone application, such as a desktop program, server program, or mobile app.

Figure 2:
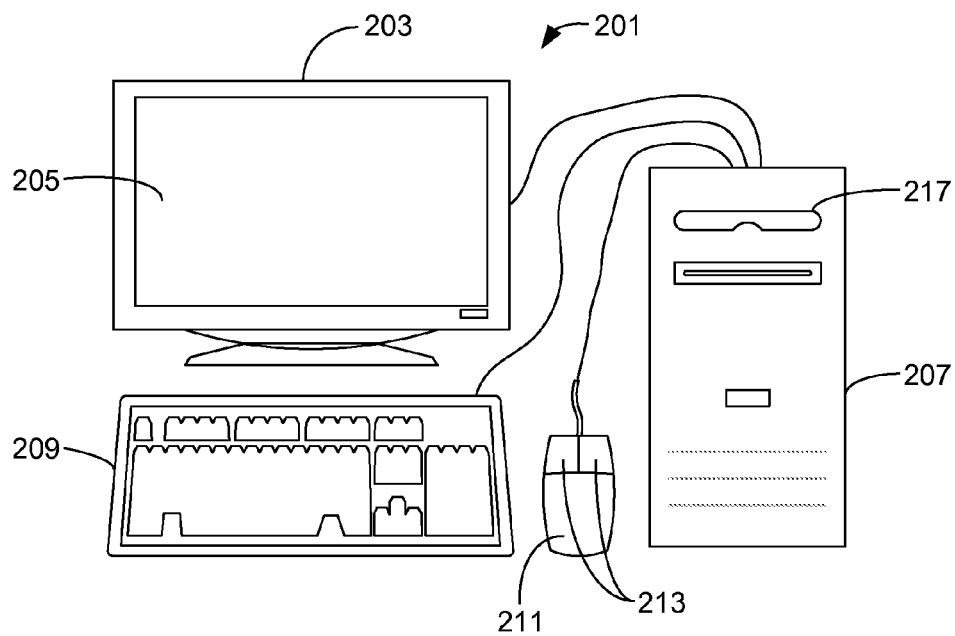
FIG. 2 shows a client or server computer system.

FIG. 2 shows an exemplary client system of the present invention. In an embodiment, a user interfaces with the system through a computer workstation system, such as shown in FIG. 2. FIG. 2 shows a computer system 201 that includes a monitor 203, screen 205, enclosure 207 (may also be referred to as a system unit, cabinet, or case), keyboard or other human input device 209, and mouse or other pointing device 211. Mouse 211 may have one or more buttons such as mouse buttons 213.

Enclosure 207 houses familiar computer components, some of which are not shown, such as a processor, memory, mass storage devices 217, and the like. Mass storage devices 217 may include mass disk drives, floppy disks, magnetic disks, optical disks, magneto-optical disks, fixed disks, hard disks, CD-ROMs, recordable CDs, DVDs, recordable DVDs (e.g., DVD-R, DVD+R, DVD-RW, DVD+RW, HD-DVD, or Blu-ray Disc), flash and other nonvolatile solid-state storage (e.g., USB flash drive), battery-backed-up volatile memory, tape storage, reader, and other similar media, and combinations of these.

A computer-implemented or computer-executable version or computer program product of the invention may be embodied using, stored on, or associated with computer-readable medium. A computer-readable medium may include any medium that participates in providing instructions to one or more processors for execution. Such a medium may take many forms including, but not limited to, nonvolatile, volatile, and transmission media. Nonvolatile media includes, for example, flash memory, or optical or magnetic disks. Volatile media includes static or dynamic memory, such as cache memory or RAM. Transmission media includes coaxial cables, copper wire, fiber optic lines, and wires arranged in a bus. Transmission media can also take the form of electromagnetic, radio frequency, acoustic, or light waves, such as those generated during radio wave and infrared data communications.

For example, a binary, machine-executable version, of the software of the present invention may be stored or reside in RAM or cache memory, or on mass storage device 217. The source code of the software of the present invention may also be stored or reside on mass storage device 217 (e.g., hard disk, magnetic disk, tape, or CD-ROM). As a further example, code of the invention may be transmitted via wires, radio waves, or through a network such as the Internet.

Figure 3:
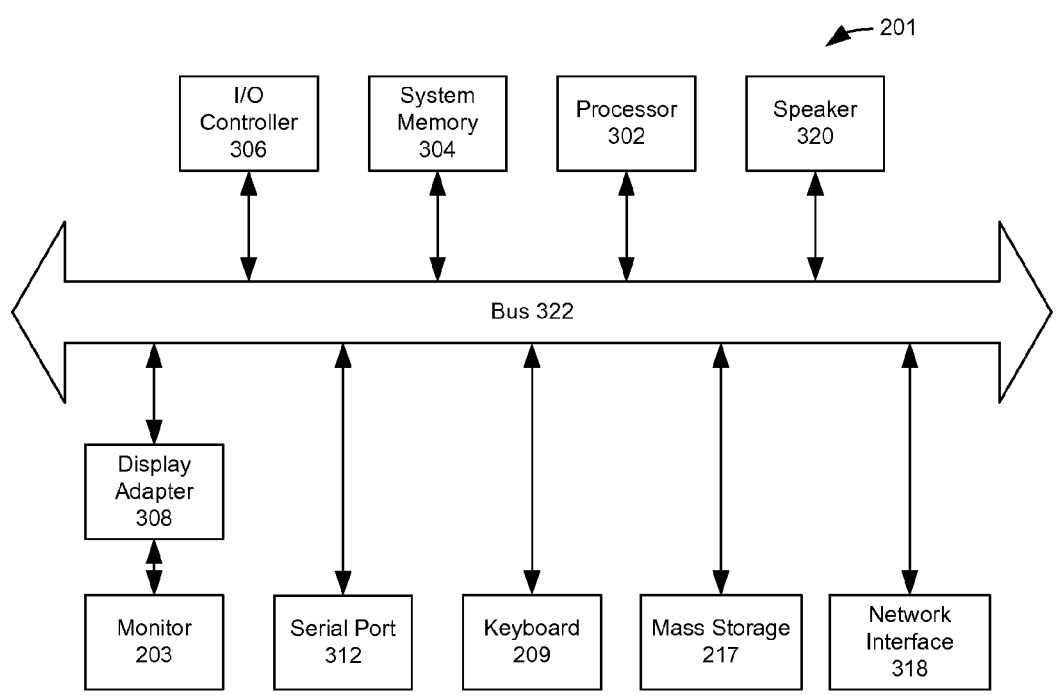
FIG. 3 shows a block diagram of components of a computer system.

FIG. 3 shows a system block diagram of computer system 201 used to execute the software of the present invention. As in FIG. 2, computer system 201 includes monitor 203, keyboard 209, and mass storage devices 217. Computer system 501 further includes subsystems such as central processor 302, system memory 304, input/output (I/O) controller 306, display adapter 308, serial or universal serial bus (USB) port 312, network interface 318, and speaker 320. The invention may also be used with computer systems with additional or fewer subsystems. For example, a computer system could include more than one processor 302 (i.e., a multiprocessor system) or a system may include a cache memory.

Arrows such as 322 represent the system bus architecture of computer system 201. However, these arrows are illustrative of any interconnection scheme serving to link the subsystems. For example, speaker 320 could be connected to the other subsystems through a port or have an internal direct connection to central processor 302. The processor may include multiple processors or a multicore processor, which may permit parallel processing of information. Computer system 201 shown in FIG. 2 is but an example of a computer system suitable for use with the present invention. Other configurations of subsystems suitable for use with the present invention will be readily apparent to one of ordinary skill in the art.

Computer software products may be written in any of various suitable programming languages, such as C, C++, C#, Pascal, Fortran, Perl, Matlab (from MathWorks, www.mathworks.com), SAS, SPSS, JavaScript, AJAX, Java, Erlang, and Ruby on Rails. The computer software product may be an independent application with data input and data display modules. Alternatively, the computer software products may be classes that may be instantiated as distributed objects. The computer software products may also be component software such as Java Beans (from Sun Microsystems) or Enterprise Java Beans (EJB from Sun Microsystems).

An operating system for the system may be one of the Microsoft Windows® family of operating systems (e.g., Windows 95, 98, Me, Windows NT, Windows 2000, Windows XP, Windows XP x64 Edition, Windows Vista, Windows 7, Windows, 8, Windows CE, Windows Mobile, Windows RT), Symbian OS, Tizen, Linux, HP-UX, UNIX, Sun OS, Solaris, Mac OS X, Apple iOS, Google Android, Alpha OS, AIX, IRIX32, or IRIX64. Other operating systems may be used. Microsoft Windows is a trademark of Microsoft Corporation.

Furthermore, the computer may be connected to a network and may interface to other computers using this network. The network may be an intranet, internet, or the Internet, among others. The network may be a wired network (e.g., using copper), telephone network, packet network, an optical network (e.g., using optical fiber), or a wireless network, or any combination of these. For example, data and other information may be passed between the computer and components (or steps) of a system of the invention using a wireless network using a protocol such as Wi-Fi (IEEE standards 802.11, 802.11a, 802.11b, 802.11e, 802.11g, 802.11i, 802.11n, 802.11ac, and 802.11ad, just to name a few examples), near field communication (NFC), radio-frequency identification (RFID), mobile or cellular wireless (e.g., 2G, 3G, 4G, 3GPP LTE, WiMAX, LTE, LTE Advanced, Flash-OFDM, HIPERMAN, iBurst, EDGE Evolution, UMTS, UMTS-TDD, 1xRDD, and EV-DO). For example, signals from a computer may be transferred, at least in part, wirelessly to components or other computers.

In an embodiment, with a web browser executing on a computer workstation system, a user accesses a system on the World Wide Web (WWW) through a network such as the Internet. The web browser is used to download web pages or other content in various formats including HTML, XML, text, PDF, and postscript, and may be used to upload information to other parts of the system. The web browser may use uniform resource identifiers (URLs) to identify resources on the web and hypertext transfer protocol (HTTP) in transferring files on the web.

Figure 4:
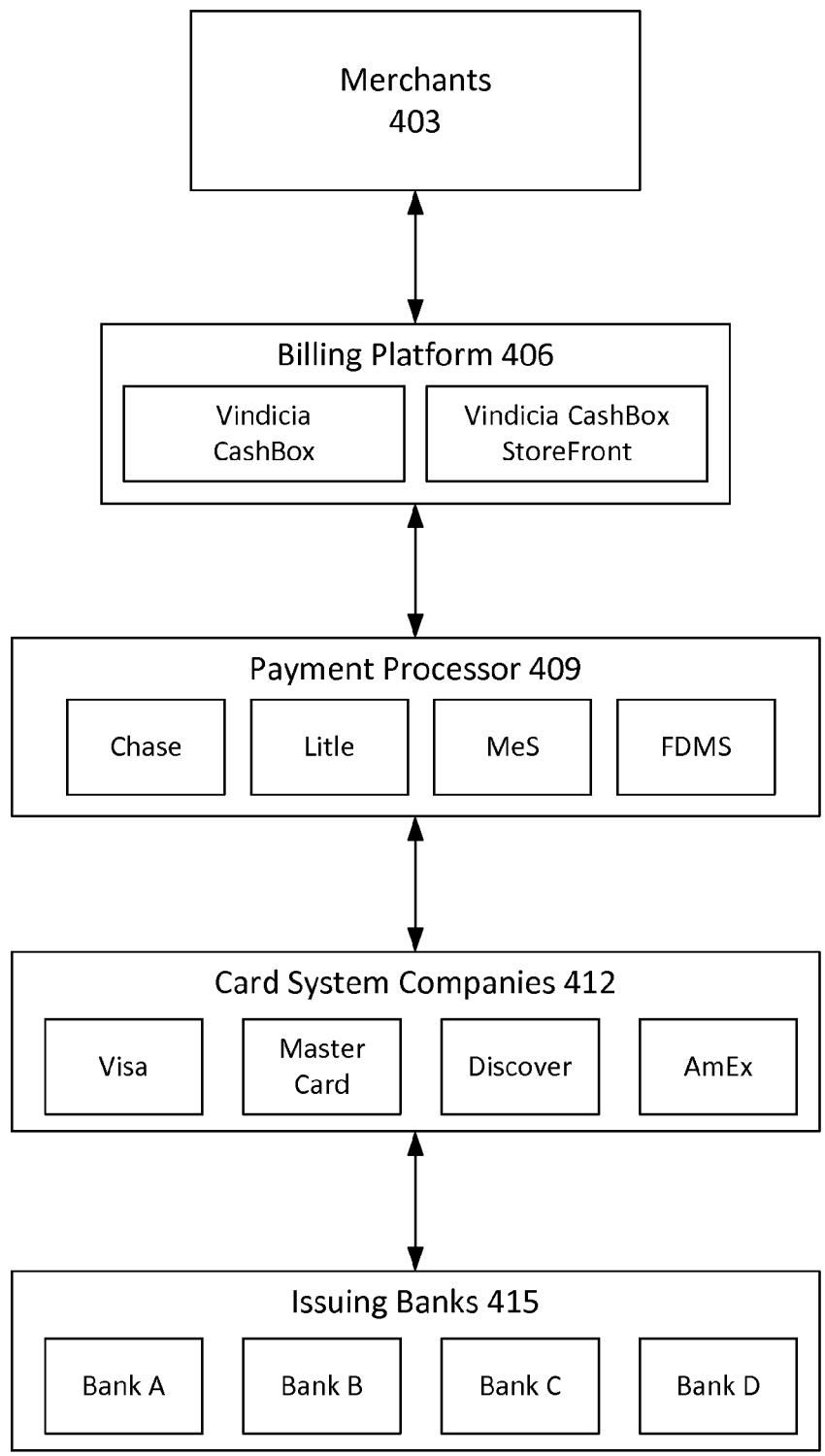
FIG. 4 shows a block diagram for a payment processing system.

FIG. 4 shows a block diagram for a payment processing system. Merchants 403 have transactions, such as purchases and credits, to be processed. A merchant can be a brick-and-mortar outlet or an on-line outlet.

Merchants can use a billing platform 406 for processing these transactions. This billing platform can be a point-of-sale (POS) software-as-a-service (SaaS) provider company that provides customer support to the merchant and is the receiver of the merchant's transactions. The billing platforms can interface between merchants and payment processors 409 or aggregator.

The POS provider represents the aggregator to merchants. The POS provider transaction volumes are small compared to the aggregator's transaction volumes. The POS provider does not handle enough traffic to warrant a direct connection to major credit card networks 412 (which are issued by issuing banks 415). The merchant also does not handle enough traffic to warrant a direct connection to the aggregator. In this way, scope and responsibilities are divided among the various business partners to easily manage the technical issues that arise.

Billing platform 406 offers a single, regulatory-compliant electronic portal that enables a merchant to scan checks (often called remote deposit capture or RDC), process single and recurring credit card payments (without the merchant storing the card data at the merchant site), process single and recurring ACH and cash transactions, process gift cards, process debit cards, and process remittances and Web payments. Using a billing platform results in cost reductions, accelerated time-to-market, and improved transaction processing quality.

Some examples of billing platforms include Vindicia's CashBox and CashBox StoreFront. See www.vindicia.com for more information. All public published content by Vindicia to the filing date of this patent application is incorporated by reference along with all other cited references in this application. This published content includes Web site pages, user guides and manuals, white papers, and other on-line and paper publications and documentation.

Figure 5:
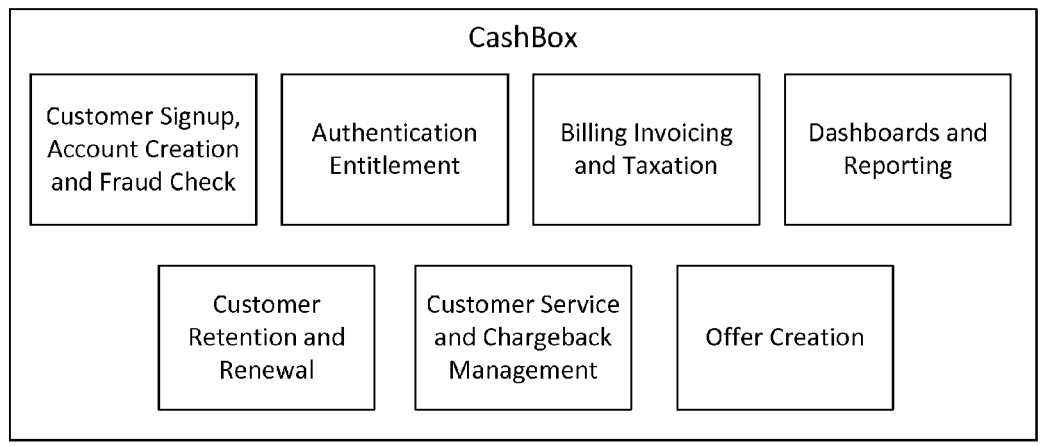
FIG. 5 shows details of a specific implementation of a billing platform.

FIG. 5 shows more details of CashBox. CashBox includes components: Customer Signup, Account Creation and Fraud Check; Authentication Entitlement; Billing, Invoicing and Taxation; Dashboards and Reporting; Customer Retention and Renewal; Customer Service and Chargeback Management; and Offer Creation.

CashBox is a software-as-a-service (SaaS) billing solution with integrated marketing best practices to optimize customer retention, enhance acquisition rates and minimize operational overhead. With CashBox, businesses selling digital content and services can take control of their business with detailed analytics and best practices to grow revenue.

This platform can help merchants and companies: Sell any form of digital content or services: software, SaaS, on-line gaming, dating, media, and on-line content. Rapidly launch new products with business model flexibility. Create or enhance their existing revenue streams and strengthen customer loyalty by billing by time, usage, automated invoicing, microtransactions, pro-rated, hierarchical, or subscriptions. Expand globally with new payment methods, currencies and support for regional tax regimes. Fight both the true and friendly fraud that exists in card-not-present environments and manage their overall chargeback rate. Test and have more control over marketing campaigns and affiliate channels. Ease or fully offload compliance with stringent PCI DSS requirements.

Some benefits of the platform include: Increase customer lifetime value by offering the right products and minimizing payment failures. Enable global transaction support through multiple processors, payment methods, currencies, and languages. Allow businesses to fully own their customer relationship, customer experience, and customer data. Support pre- and post-paid business models that enable both automatic payments and traditional invoicing. Shorten time-to-market by enabling business users to easily manage product configurations, pricing plans, customer notifications, and even account information via an on-line portal interface. Make better business decisions and understand key trends with detailed dashboards, reporting, and analytic capabilities. Recover lost revenue with built-in fraud screening and chargeback management. Greatly ease or fully eliminate PCI DSS compliance burden by offloading storage and processing of payment information to the platform.

The platform has global transaction support: Support for multiple payment methods including credit cards, signature debit cards, ACH, PayPal, ELV, prepaid cards, mobile payments, and other alternative payment methods. Built-in payment gateway to seamlessly manage and submit transactions to our top-tier payment processor partners. Support for multiple worldwide processors and global currency support with routing by country, currency, or product. Ability to send out customized billing messages in nearly any language. Built-in tax engine with worldwide tax code support.

The platform has proprietary advanced payment retry logic: Automated management of customer renewals and billing retries. Support for multiple payment types and multiple methods of payment per transaction. Optimized and configurable billing and rebilling schedules. Minimize card failures with payment capture logic and complete support for Account Updater. Payment failure analysis, management, and notification.

The platform has campaign management and promotional marketing: Automatically generate promotional codes and track campaign effectiveness. Subscription lifecycle management. Automated customer activation and deactivation logic. Customizable, event-based billing messaging. Full access to customer data and reports for marketing, remarketing, cross-selling, and up-selling. Free trial logic with "Payment method required."

The platform has scalability and reliability: designed to support millions of transactions per day. Handle billions of transactions in a year. Built-in scalability overhead of at least five times transaction run-rate. Uptime of over 99.99 percent for all critical client facing functions. Geographic and hardware-based failover protection throughout the infrastructure.

The platform has product and billing administration: On-line portal interface enables business users to quickly make changes to key billing functions. Support for role-based access control. Create, manage, and end-of-life product offerings. Manage critical aspects of pricing plans and promotions.

The platform has security and compliance: Hosted Order Automation (HOA) is available to completely offload PCI DSS burden. Advanced cryptographic key management. Cryptographically-enforced permissions, roles, and responsibilities. Certified as a PCI DSS Level 1 Service Provider. Certified with SSAE-16 to ease Sarbanes-Oxley compliance.

The platform has integrated fraud management: Real-time fraud screening to determine and score chargeback probability based on our client-network of customer data. Automated chargeback fighting to recover lost revenues. Built-in reporting that allows clients to identify and fight the root causes of fraud.

The platform has dashboards, reports, and analytics: Visualize transaction and subscriber information and manage product offerings, price plans based on real aggregated transaction and customer data. Track affiliate revenue and payments, customer acquisition and retention, and payment trends among customers. Over twenty reports are available on-line, via download, or through automated API pull of relevant data for further analysis.

The platform has microtransaction support: Enable popular business models including virtual currencies, loyalty programs, and service utilization metering with our token abilities. Support multiple types of usage units per billing plan as well as multiple billing plans per account with full balance management for each virtual currency, point or usage unit. Leverage hybrid model that use both one-time microtransactions and subscription billing.

The platform has automated invoicing: Enables an enterprise to present an aggregate, itemized invoice to their business customer, and enable its payment. Manage all attributes of the products (prices, effective dates, entitlements, and others) individually, or in hierarchical groups or bundles. Automatic invoice creation with configurable populated fields including customer, product, billing plan, and cross-sell and up-sell links, in any combination.

The platform has customer support: Rapidly find and update customer accounts via on-line portal interface. Easily modify customer billing and payment information. Change payment methods or billing frequency. Automatic account suspension in the event of chargebacks. Ability to access customer transaction history and view any past or pending chargebacks.

Figure 6:
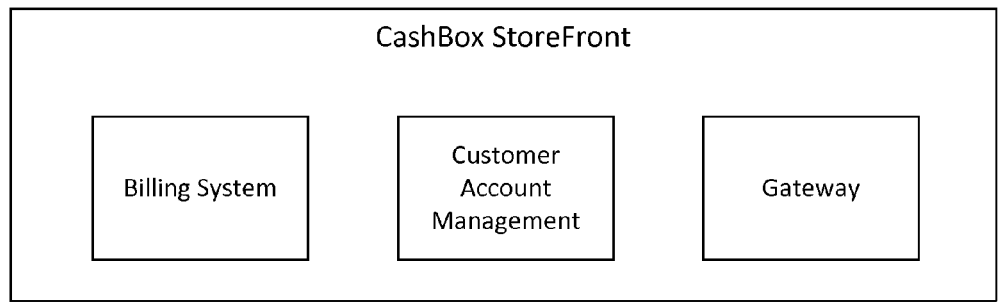
FIG. 6 shows details of a specific implementation of a billing platform.

FIG. 6 shows more details of CashBox StoreFront. CashBox StoreFront includes components: Billing System, Customer Account Management, and Gateway. CashBox StoreFront is an extension of Vindicia's CashBox platform, and combines the offer management capabilities of a traditional storefront with the customer retention and churn management capabilities of CashBox. CashBox StoreFront is designed to help on-line marketers easily optimize customer acquisition capabilities for digital content and services.

CashBox StoreFront supports a number of core merchandising and offer management capabilities, without the need for programming, including: Customer-facing Web pages that clearly define new products; promotions and special offers; virtual catalogs; and Multiple payment method options. The platform also facilitates customer self service including: viewing and changing account information, updating personal information, adding or updating payment methods, and ordering additional products or services. The combination of CashBox and CashBox StoreFront provides a compelling solution for digital merchants to support the full customer acquisition, management, billing and retention cycle.

Another method to access the CashBox platform (not shown in 406) is Vindicia's CashBox Select. Large digital businesses often have large existing investments in a billing platform and perform well at enhancing customer lifetime values through proven customer retention techniques. However, even the best-managed companies cannot take advantage of, for example, 80 million credit cards and 120 million customer accounts to provide deep insight into why a transaction fails.

CashBox Select is specifically designed for larger digital businesses that want to keep their existing billing infrastructure, but seek a no-risk approach to overcoming customer payment failures. CashBox Select uses ART™ technology to analyze a merchant's failed transactions, compares them with best practices across the billing platform's client network (e.g., Vindicia's billing platforms have processed over $4 billion) and applies this knowledge to the failed transactions. ART™ is a trademark of Vindicia.

The platform then hands back these successful transactions to the client billing engine, so the business can reap the benefits of increased retention. Clients typically see a success rate of 30-40 percent on their previously failed transactions once integrating the CashBox Select platform.

On a monthly subscription service, the business can often materially increase customer lifetime value. This is important because these customers want to use your service and are not ones who have actively opted out.

The platform analyzes different data to determine whether a transaction will successfully go through: partial authorization status, processor error code results, bank identification number or BIN, issuer identification number (IIN), historical knowledge, and more. Since the platform understands what transactions have the highest likelihood of success, there is also minimal impact to your chargeback volumes or rate.

The platform identifies which transactions to target using a variety of factors including: transaction history across the entire billing platform network (e.g., including CashBox, CashBox StoreFront, CashBox Select, and other Vindicia products); transaction history across clients (e.g., different clients) in similar industries; client's successful and failed transaction activity; and reason codes (e.g., bin codes) of failed transactions. Benefits include increase revenue, higher customer lifetime values, and continual insight from platform's network effect.

Returning to FIG. 4, the billing platform can interface with any number of payment processors or aggregators. Some examples of processors include: Chase Paymentech, Litle & Co. (acquired by Vantiv, Inc.), Merchant e-Solutions (MeS) Payment Gateway (from Auric Systems International), First Data Merchant Services (FDMS), and WorldPay.

A payment processor is an entity appointed to handle transactions (e.g., credit cards, gift cards, and other credit, debit, and payment instruments) for merchant acquiring banks They are usually broken down into two types: front-end and back-end. Front-end processors have connections to various card associations and supply authorization and settlement services to the merchant banks' merchants. Back-end processors accept settlements from front-end processors and, via the Federal Reserve Bank, move the money from the issuing bank to the merchant bank.

In an operation that will usually take a few seconds, the payment processor will both check the details received by forwarding them to the respective card's bank issuing bank or card association for verification, and also carry out a series of anti-fraud measures against the transaction. Additional parameters, including the card's country of issue and its previous payment history, are also used to gauge the probability of the transaction being approved.

Once the payment processor has received confirmation that the payment details (e.g., credit card details) have been verified and that the issuing bank will accept the transaction, the information will be relayed back via the payment gateway to the billing platform (on behalf of the merchant), who will then complete the payment transaction. If verification is denied by the card association, the payment processor will relay the information to the billing platform (on behalf of the merchant), who will then decline the transaction.

Payment processor 409 interfaces with the card system companies 412 which issue cards, such as Visa, MasterCard, Discover, and American Express. The payment processor can make inquiries to the appropriate card system companies to request approval for payment, check credit limits, and so forth. The cards are issued by issuing banks 415, such as banks A, B, C, and D (e.g., Chase, Bank of America, Wells Fargo, Citibank, and U.S. Bank).

As the sales of content, software, gaming, and dating have shifted from larger cost single physical items sales to digital content there has been a shift in business models towards lower up front cost transaction models that rely upon longer customer lifetimes of ongoing either recurring subscription billing or future virtual goods/currency purchases. This shift, combined with the pressure that piracy of digital goods and services places on the pricing leverage of digital companies, forces digital merchants to look for additional ways to extend the lifetime of each subscriber or digital goods purchaser. This happens at the same time that individual consumer's credit and debit cards change rapidly due to expiration, bank mergers, and the loss or theft of the consumer's card due to data breach or criminal activity. The constant changing of account information wreaks havoc on the ability for a digital merchant to process a recurring or future virtual goods transaction for existing subscribers/customers who become ensnared in these macro trends.

One of the core values to digital merchants of CashBox is the systems and processes built into the SaaS platform that work to recover an existing customer's payment attempt if it initially fails. These systems recover from about 2 percent to about 8 percent on average of a digital merchant's entire customer base each month. Depending on the average remaining customer lifetime, that customer retention compounds into annualized revenue increases between 10 percent and 25 percent above the revenue the digital merchant would not have collected absent the retention systems.

Figure 7:
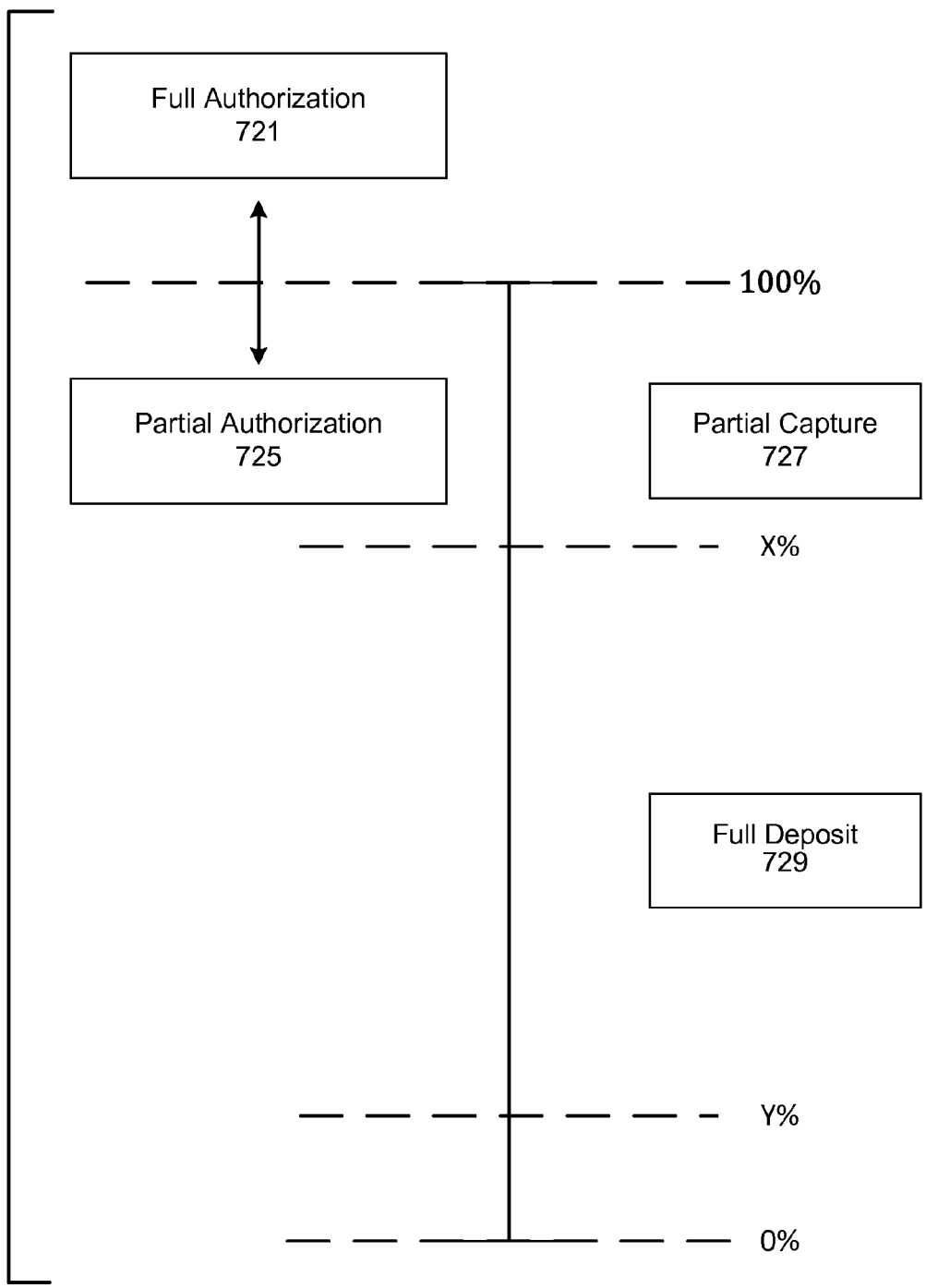
FIG. 7 shows a chart for full and partial authorizations of transactions by a payment processor.

FIG. 7 shows a chart for full and partial authorizations of transactions by a payment processor. This chart can be implemented in a software platform. The system can accept a full authorization 721. The payment processing system can also be configured to accept or allow a partial authorization 725, of which there are partial capture 727 and full deposit 729 types.

Most card issuing banks have implemented partial authorizations on both prepaid or stored value and classic debit and credit card accounts. By enabling partial authorization responses at a merchant processor, a merchant (or a service provider like CashBox on behalf of the merchant) can determine additional data about which accounts are available for a full deposit upon a partial authorization and how much credit limit or funds are already available for the given transaction.

The merchant can either decide to immediately discount a recurring or initial transaction to the funds available, especially if the card is a prepaid or stored value card, or the merchant can determine that the account is a classic credit or debit account and can actually request the full value of the transaction to be deposited regardless of the funds available. If the card is a prepaid or stored value card, the merchant can only choose to either take the partial amount, deny the transaction, or offer to take the partial amount while asking for an additional payment method.

A partial authorization response allows the merchant to only ask for full deposits on accounts where there are funds or there is a high likelihood of the full deposit working without generating a chargeback. Coupling this method with analysis of chargeback flow to disable any issuing bank that decides to generate chargebacks for these types of deposits allows a merchant to have both more initial and subsequent transactions succeed which leads to increased customer acquisition, increased customer retention, and subsequent revenue and profitability increases.

Figure 8:
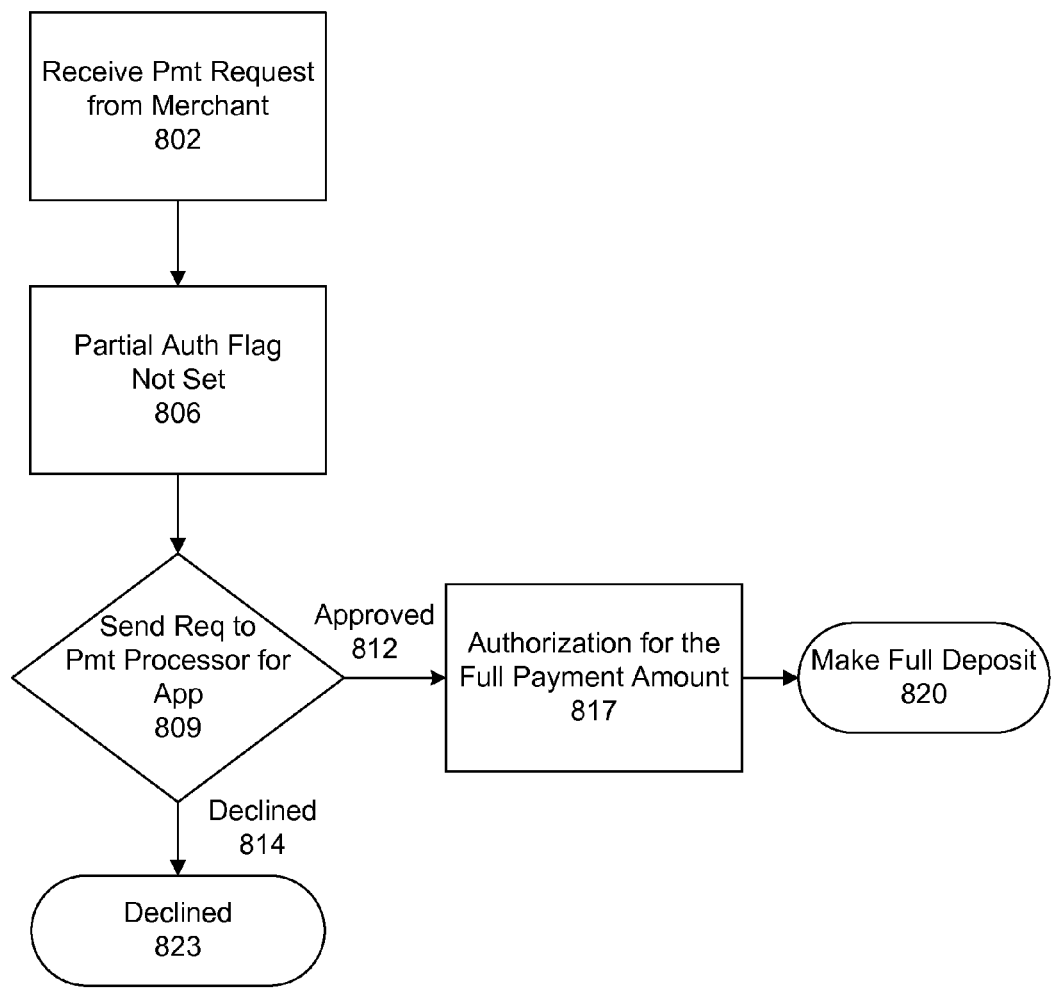
FIG. 8 shows a full authorization flow.

FIG. 8 shows a full authorization flow. A buyer attempts to make a transaction from a merchant using a card (e.g., credit card or gift card). A merchant sends a request for approval of a transaction to a billing platform. In a step 802, the billing platform receives this transaction. In this flow, the partial authorization flag is not set (806). In a step 809, the billing platform processes the transaction by sending a request for payment from the payment processor. In sending the request to the payment processor, the billing platform does not set the partial authorization flag.

The payment processor returns an approval (812) or decline (814). If approved, the authorization for full payment is returned to the billing platform (817). The billing platform makes a full deposit (820). When the amount approved is 100 percent of the requested amount, this is a full authorization 721. If declined, the billing platform returns this result to the merchant. And the merchant does not accept payment via the buyer's card (823).

Some specific flow implementations are presented in this patent application, but it should be understood that the invention is not limited to the specific flows and steps presented. A flow of the invention may have additional steps (not necessarily described in this application), different steps which replace some of the steps presented, fewer steps or a subset of the steps presented, or steps in a different order than presented, or any combination of these. Further, the steps in other implementations of the invention may not be exactly the same as the steps presented and may be modified or altered as appropriate for a particular application or based on the data and circumstance.

Figure 9:
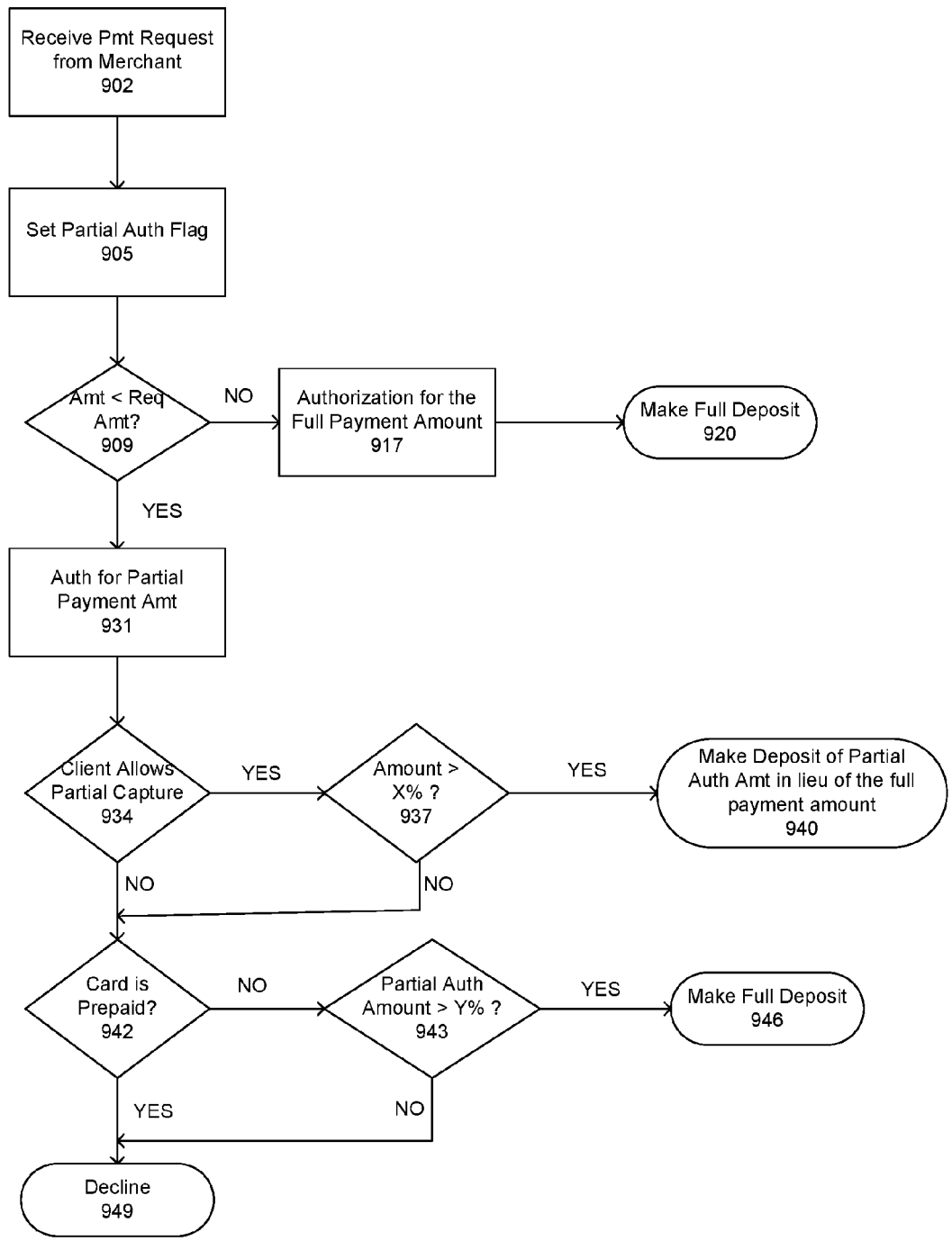
FIG. 9 shows a partial authorization flow.

FIG. 9 shows a partial authorization flow. A buyer attempts to make a transaction from a merchant using a card (e.g., credit card, debit card, gift card, or stored value card). A merchant sends a request for approval of a transaction to a billing platform. In a step 902, the billing platform receives this transaction. In this flow, the partial authorization flag is set (905).

In a step 909, the billing platform processes the transaction by sending a request for payment from the payment processor. In sending the request to the payment processor, the billing platform sets the partial authorization flag. The payment processor returns an amount which has been approved. Because the partial authorization flag is set, the approved amount can be equal to the requested amount or less than the requested amount.

If the amount is equal to the requested amount, the transaction has been approved for the full payment amount (917). The billing platform makes a full deposit (920).

If the amount is less than the requested amount, this is a partial authorization or authorization for a partial payment amount 931. The billing platforms checks whether the merchant (e.g., client of the billing platform) will accept a partial capture (934). If yes, this means the merchants has agreed to accept lesser amount than full payment, providing the amount is greater than an X percent of the full amount. The X value is configurable by the merchant, but may be altered or overridden due to other factors (more details presented below).

The billing platform checks whether the approved amount is greater than X percent of the full amount (937). If yes, the billing platform makes a deposit of the partially authorized amount (940). This may be referred to as a partial capture 721.

For example, a buyer attempts to pay for a transaction using a gift or stored value card, but does not know the exact amount remaining on the gift or stored value card. The merchant tries to request payment using this card. The payment processor attempts to obtain payment of $25 on the merchant's behalf. The merchant has decided to accept partial captures, as long as the amount is 80 percent or greater of the full amount.

Then while setting the partial authorization flag, the billing platform makes a request to payment processor. The processor returns an amount $23. Since this amount is greater than $20 (80 percent of $25), the billing platform makes the deposit of $23 for the merchant, and accepts this amount in lieu of full payment. By choosing to accept partial captures, merchants can generate additional revenue which normally would have been lost (since this transaction would not been processed if partial authorizations were not allowed).

If the approved amount is less than X percent, the billing platform will not deposit the partial capture and billing platform processing continues to step 942. If partial captures are not allowed by the merchant, processing also continues to a step 942. In step 942, it is determined whether the card is a prepaid card. If the card is a prepaid card, the billing platform declines the transaction (949). If the card is not a prepaid card (i.e. the card is a credit card), the billing platform checks in step 943 whether the partially authorized amount is >Y %. Y can be set by the merchant, but may be altered or overridden due to other factors (more details presented below). X is typically greater than Y.

If the partially authorized amount is greater than Y percent, the billing platform attempts to make full deposit (946), which is a deposit of the full requested amount. The requested amount is greater than the partially authorized amount. The billing platform will attempt to request this full amount even though the payment processor has not approved it.

If the partially authorized amount is less than Y percent, the billing platform declines the transaction (949). The billing platform returns this declined result to the merchant. And the merchant does not accept payment via the buyer's card.

In an embodiment, the CashBox handles application program interface (API) requests from merchants via an application server utilizing a SOAP (Simple Object Access Protocol) interface. These requests are either serviced entirely on the application server or the application server connects to other vendor servers to perform operations on its behalf before responding to the request. The API provides methods allowing merchants to authorize charges in real-time (e.g., Transaction.auth) as well as create and manage subscriptions (e.g., AutoBill.update) that will perform charges on behalf of the merchant in the future. In the case of real-time charges, the application server immediately routes the request to the appropriate external payment processing vendor, records the result of the request, and returns the result to the merchant. Subscription charges can occur in real-time and at other times in the future. Real-time subscription charges are handled when the merchant calls AutoBill.update in the same manner as calls to Transaction.auth. Future billings are initiated by an application server on behalf of the merchant and the results are made available through the API.

The Transaction.auth method will have an optional parameter, requestPartialAuth. The default value will be false. When Transaction.auth is called with requestPartialAuth equal to true CashBox will attempt to request a partial authorization from the payment provider. If the call results in a full authorization then there will be no difference in the return value from when requestPartialAuth is set to false. If the call results in a partial authorization then the following will occur:

1. A partial auth flag will be set to true on the return.
2. The amount of the transaction will be modified to reflect the amount of the authorization.
3. The original amount will be recorded in the Transaction originalAmount field.
4. The Transaction partialAuth field will be set to true.

Calling Transaction.capture will capture the partial amount. If the amount is below what the merchant wants Transaction.cancel will cause the auth to be voided. The Transaction.authCapture method will have an optional parameter, partialAuthThreshold, defining the percentage of the full amount that the merchant is willing to accept. When Transaction.authCapture is called with partialAuthThreshold set to any value below 100 a partial authorization will be requested. If the amount authorized is below the threshold then the call will fail. If the amount authorized is above the threshold the transaction will be captured. If no threshold is set the default value is 100 signifying that no partial amount should be accepted.

Partial auth for recurring transactions will be enabled by a merchant option. Additionally a default threshold can be set as a merchant option. The AutoBill object will have an optional field for the percentage the merchant is willing to accept to grant entitlement. If the threshold is set and is less than 100 then a partial auth will be requested. If the amount authorized is above the threshold indicated by the percentage the amount will be captured and the customer will be fully entitled.

In an implementation, no further attempts will be made to collect on this billing and the next billing will be scheduled. A partial payment notification will be sent to the customer.

In another implementation, the BillingPlan period is monthly or smaller then no further attempts will be made to collect on this billing and the next billing will be scheduled. A partial payment notification will be sent to the customer.

If the BillingPlan period is greater than a month then CashBox will schedule another billing event a month from now for the remainder of the amount. A partial payment notification will be sent to the customer detailing the future billing event.

Full deposit will be enabled via a merchant option. There are several scenarios available:

1. If partial auth is enabled then the rules for partial auth will be followed first and if the amount authorized is above the threshold a partial amount will be captured. However, if the amount is below the threshold CashBox will capture the full amount. This is done in order to blend the risk.

2. If partial auth is not enabled then there are two options: (i) Partially auth all transactions with credit limit responses and only fully capture successful partial auths. (ii) Fully capture all transactions with credit limit responses without attempting a partial auth.

Regardless of the partial auth option the system does not perform full deposit for a card that has been identified as a prepaid card because there is no extra money to capture. Before initiating a full deposit, the system will check to make sure that the account BIN is not on the merchant list of non participating BINs. This list will be populated with BINs that are known to issue technical chargebacks on full deposits. While the system may share this list between merchants, the system can track this separately.

In order to minimize the chargeback risk to the merchants, the system has a process that compares the velocity of chargebacks on a specific BIN to historical norms and if it exceeds a certain value, the process will add that BIN to the black list and alert card system.

Figure 10A:
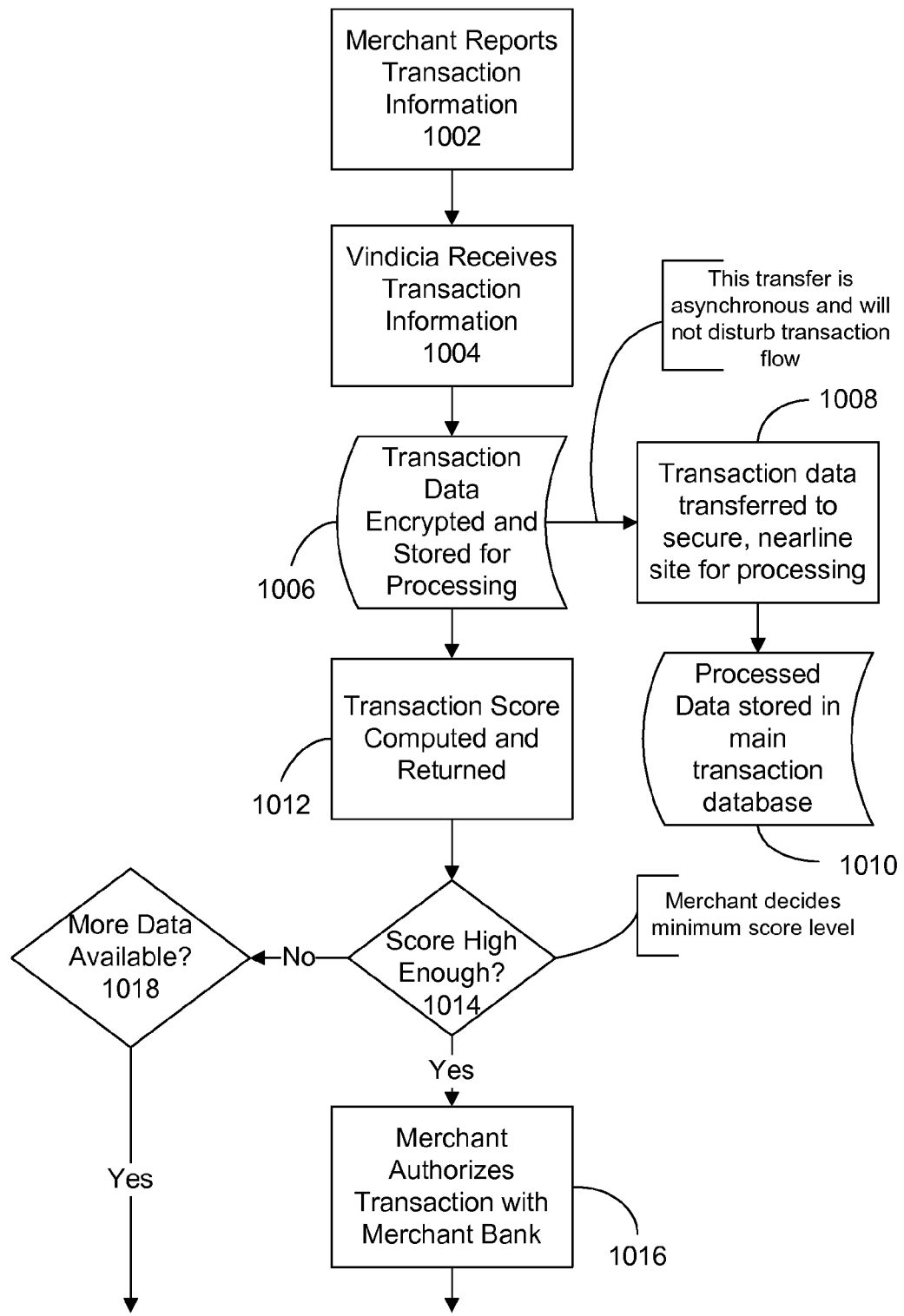
FIGS. 10A-10B show a transaction data flow for a billing platform.
Figure 10B:
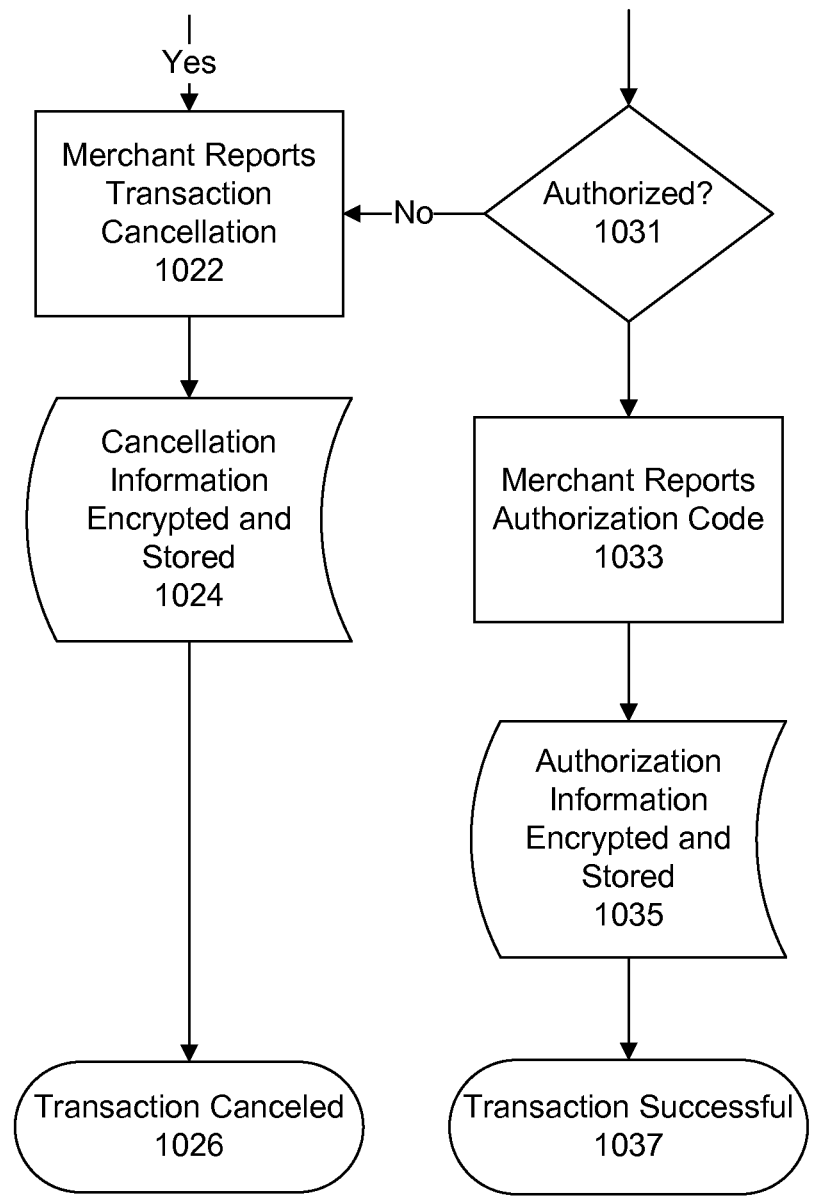

FIGS. 10A-10B show a transaction data flow for a billing platform. In a step 1002, a merchant reports transaction information. In a step 1004, the billing platform (e.g., Vindicia CashBox) receives transaction information. In a step 1006, transaction data is encrypted and stored for processing. In a step 1008, transaction data is transferred to secure, near-line site for processing. This transfer is asynchronous and will not disturb transaction flow. In a step 1010, processed data is stored in main transaction database.

In a step 1012, a transaction probability is computed and returned. In a step 1014, the platform checks whether the probability of a successful transaction is high enough. The system (e.g., Vindicia CashBox ART) decides minimum probability level. If yes (i.e., sufficiently high probability), in a step 1016, the system requests a deposit transaction with merchant bank.

For example, when a merchant or client has failed a batch of, for example, 100 transactions, they transfer to our system for further handling. The system attempts authorization and then runs the probability analysis on the results of those partial authorizations that did not just pass the full authorization or partial authorization threshold. From there the system decides which ones that failed to then fully deposit or attempt to work around and re-partial auth.

If no (i.e., probability not sufficiently high), the platform attempts to change certain features of the transaction to attempt to successfully authorize or partially authorize the transaction. In step 1022, the platform reports transaction success or failure. In step 1024, cancellation information encrypted and stored. And in step 1026, the transaction is canceled.

After step 1016, the billing platform checks whether the transaction is authorized (1031). If no, processing proceeds to step 1022. If yes, processing proceeds to a step 1033, merchant reports authorization code. In a step 1035, authorization information encrypted and stored. In a step 1037, the transaction is successful. In a specific implementation (e.g., for ART transactions), the system pushes the authorization, partial authorization, and captures and the full deposits through to the payment processor. The system informs the client is that the client should extend entitlement. The client does nothing at the payment processor.

Figure 11A:
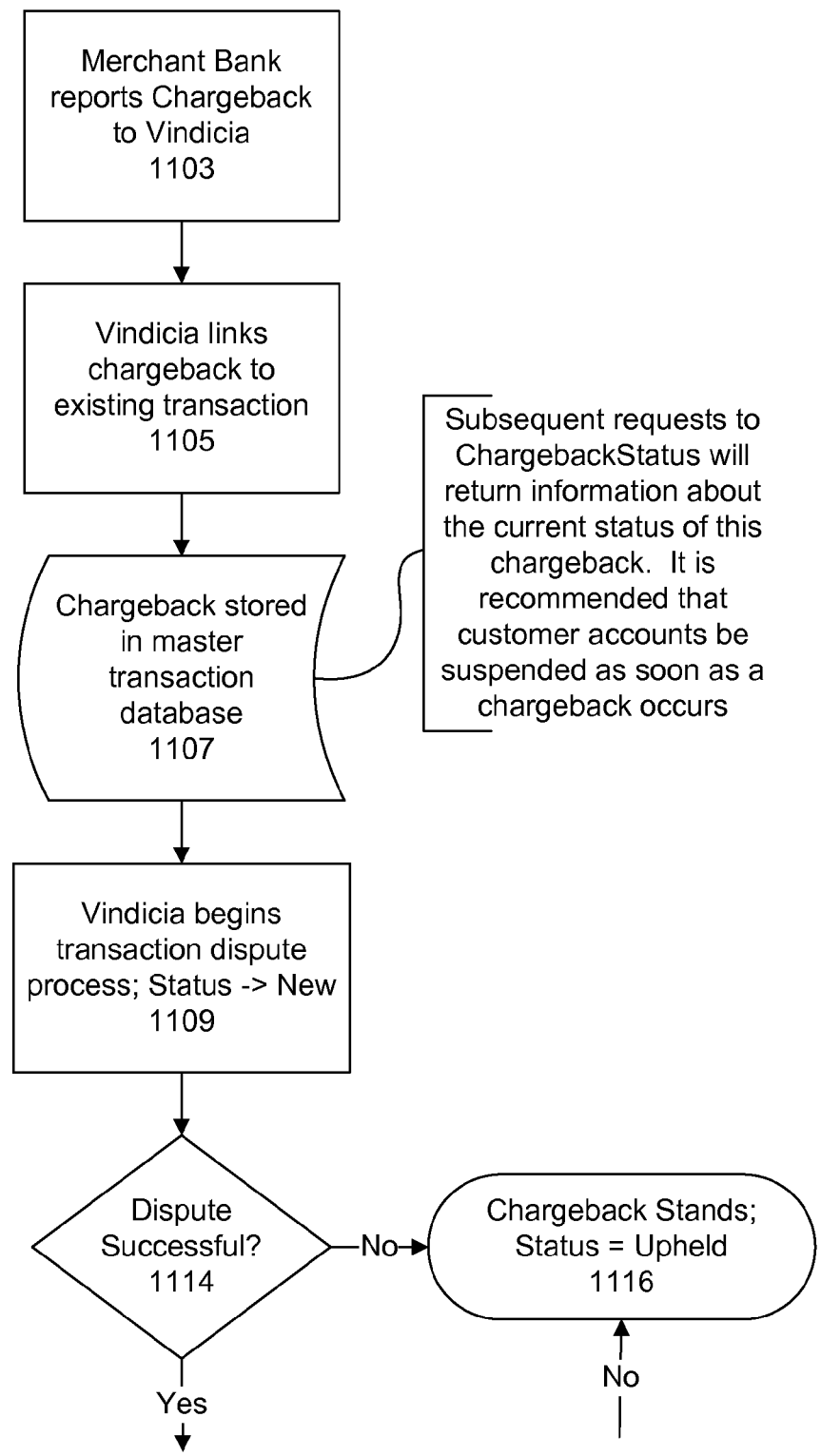
FIGS. 11A-11B show a chargeback data flow for a billing platform.
Figure 11B:
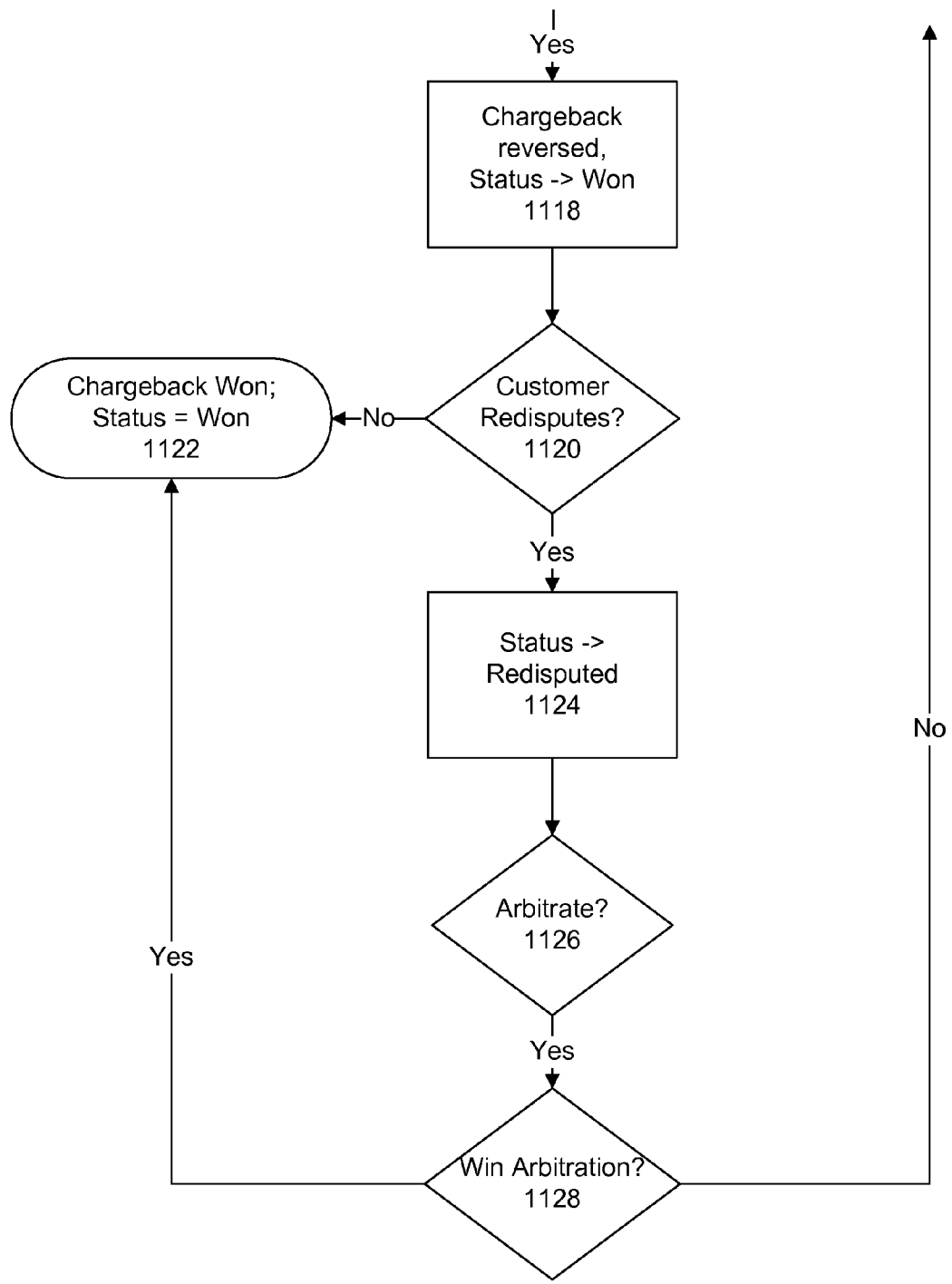

FIGS. 11A-11B show a chargeback data flow for a billing platform. In a step 1103, a merchant bank reports a chargeback to the billing platform (e.g., Vindicia CashBox, ChargeGuard module). In a step 1105, the platform links the chargeback to an existing transaction. In a step 1107, the chargeback is stored in master transaction database. Subsequent requests to chargeback status will return information about the current status of this chargeback. Generally, it is recommended that customer accounts be suspended as soon as a chargeback occurs.

In a step 1109, the platform begins a transaction dispute process. The status is "new." The dispute can be successful or not successful (1114). If the dispute is not successfully challenged (1116), the chargeback stands and the status is "lost."

If the dispute is successfully challenged (1118), the chargeback is reversed and the status is "won." The customer can redispute the transaction (1120). If the customer does not redisputes (1122), the chargeback is won and the status becomes "won." If the customer redisputes (1124), the status becomes "redisputed." The matter can go into arbitration (1126), which can be won or loss (1128). If the arbitration is won, proceed to step 1122 (i.e., chargeback is won). If the arbitration is not won, proceed to step 1116 (i.e., chargeback is lost).

Figure 12A:
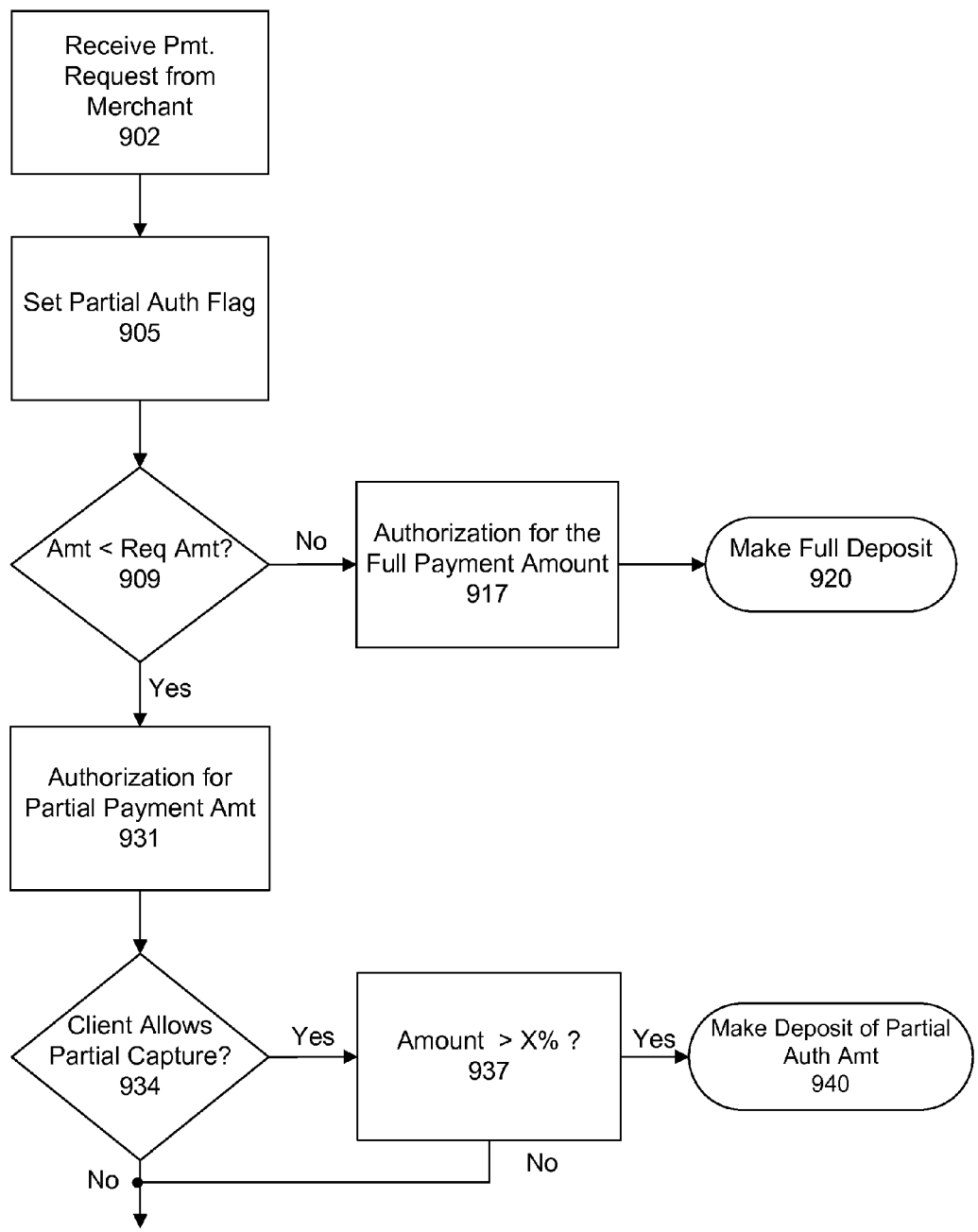
FIGS. 12A-12B shows another implementation of a partial authorization flow.
Figure 12B:
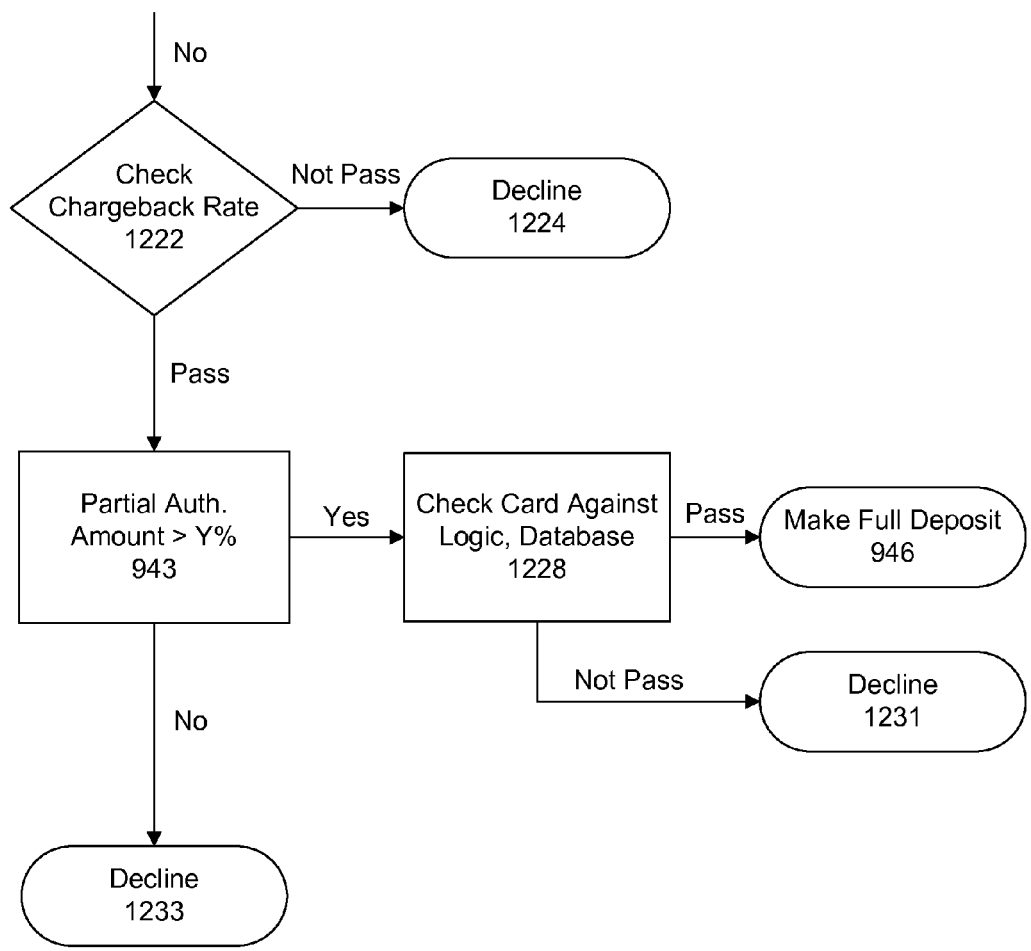

FIGS. 12A-12B shows another implementation of a partial authorization flow. This flow is similar to that described in FIG. 9. In FIG. 12A, steps 902, 905, 909, 917, 920, 931, 934, 937, and 940 are as described for FIG. 9.

In FIG. 12B, after steps 934 and 937 (where the partially authorized amount is not deposited), the billing platform evaluates the chargeback rate 1222. This evaluation can be based on the history and experience of the platform with respect to the merchant, card holder, issuing bank, and other factors. If the chargeback rate check is not passed, the transaction is declined (1224).

In a specific implementation, Vindicia's ART technology ignores whether the non "technical chargebacks" are won or lost. The chargebacks ART selects for ranking whether to full deposit against this BIN are the "technical" ones that arrive within about 7-14 days and are not generally disputeable.

If the chargeback rate check passes, in step 934, the billing platform checks whether the merchant (e.g., client of the billing platform) will accept a partial capture. If the partially authorized amount is greater than Y percent, the billing platform performs a logic check (1228), checking the card against logic and database. In a specific implementation, the rate of chargebacks the system sees from a BIN is checked as described above (see steps 1012-1016 and accompanying description) to create the probability.

Figure 13:
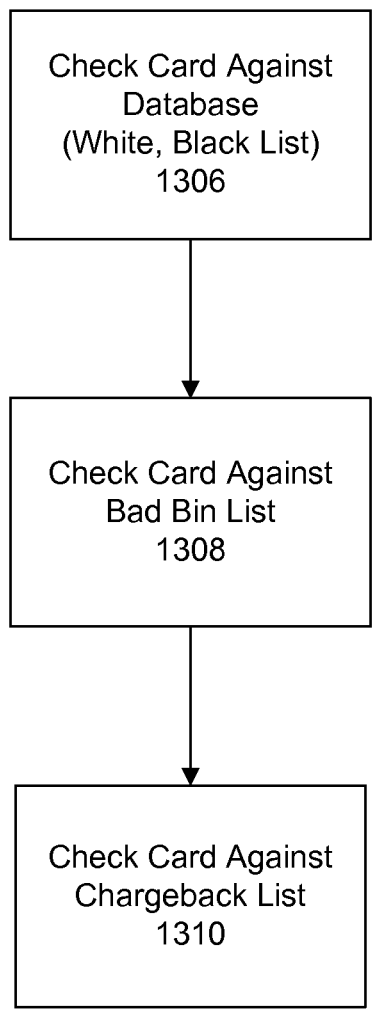
FIG. 13 shows a sample flow for a logic check.

FIG. 13 shows a sample flow for a logic check 1228. In a step 1306, the billing platform checks the card against databases maintained by the system. For example, these can include white lists, grey lists, back lists, and the like. In a step 1308, the platform checks the card against the bad bin list (BIN). In a step 1310, the platform checks the card against the chargeback list.

Returning to FIG. 12B, if the logic check passes, the billing platform attempts to make full deposit (946), which is a deposit of the full requested amount. If the logic check does not pass, the transaction is declined (1231). If the partially authorized amount is less than Y percent, the billing platform declines the transaction (1233).

In another implementation, even after the billing platform has determined the transaction should be declined, such as for steps 1224, 1231, and 1233 in FIG. 12B, the platform can perform additional processing to attempt to save the transaction.

Figure 14:
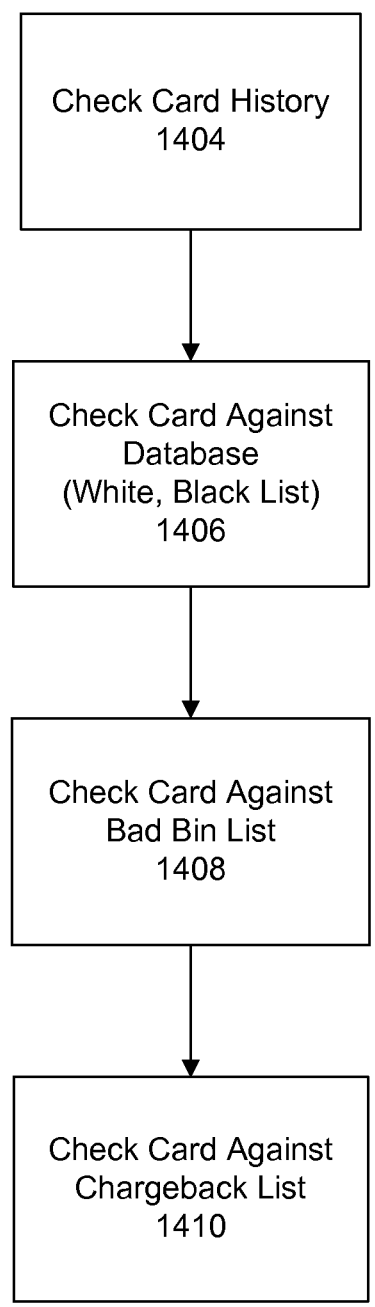
FIG. 14 shows a flow to attempt to save failed transaction.

FIG. 14 shows a flow to attempt to save failed transaction. These failed transactions can be from another billing platform (e.g., software of another company) or payment processor, or from the same billing platform (e.g., steps 1223, 1231, or 1233 if FIG. 12B).

In a step 1404, the card history is checked. In a step 1406, the billing platform checks the card against databases maintained by the system. For example, these can include white lists, back lists, and the like. In a step 1408, the platform checks the card against the bad bin list. In a step 1410, the platform checks the card against the chargeback list. Using this flow, the billing platform may determine that a full deposit (or partial deposit) can be made.

An important factor is that some small proportions of BINs that are blacklisted have to come back off the blacklist over time. The system looks at the technical chargeback percentage rate by BIN to compare successful transactions to technical chargebacks to make sure that the system is only blacklisting BINs that have a very high rate of technical chargebacks. The system also is implementing a shorter term velocity check to make sure that a large number of successful full deposits historically are not masking a current trend of close to 100 percent transaction failure.

Aggregating Credit Card History

Figure 15:
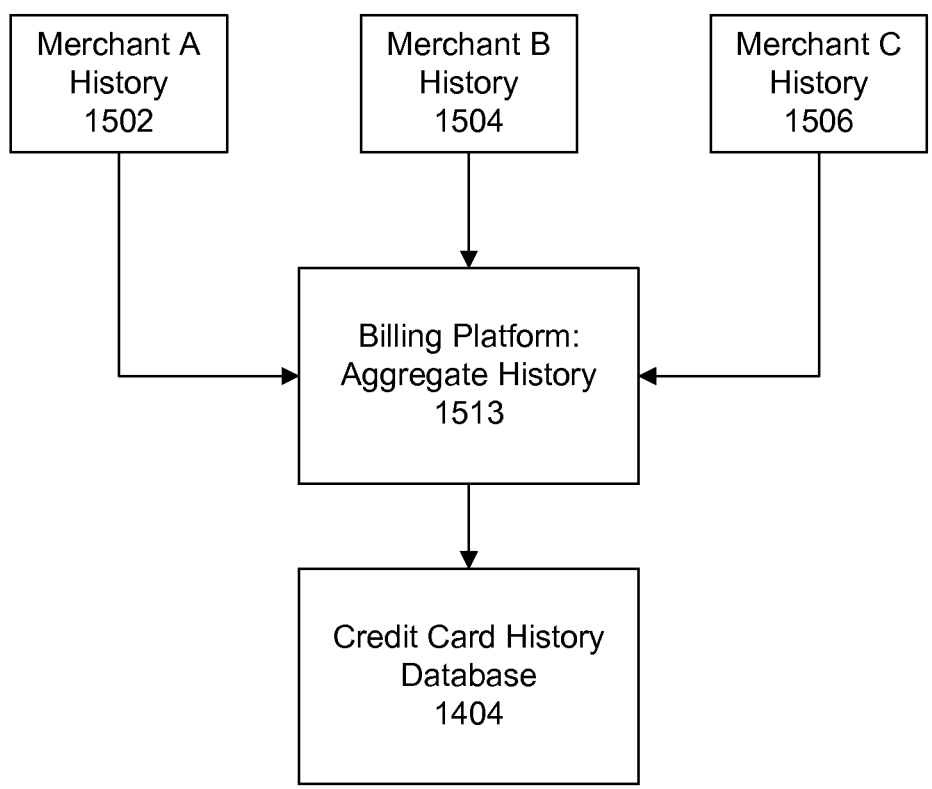
FIG. 15 shows a block diagram on creating and updating a credit card history database.

FIG. 15 shows a block diagram on creating and updating a credit card history database. Card history 1404 in FIG. 14 is an example of such a credit card history database, and can be used for background checking, such as during logic check 1228 in FIG. 12B.

Merchants have experience with the credit cards of their customers. This experience includes credit card success rate, chargebacks, fraud, and the like. These credit cards are processed through various payment processors including, among others, Chase Paymentech, Litle (Vantiv), and MeS.

Credit card history information is confidential. So, a merchant usually has access to only its own credit card history. The payment processor tracks the credit card history information of the merchant, as well as other merchants. A merchant is not able to view or access the credit card history of other merchants. Some payment processors may allow a merchant to access its credit card information on-line (such as through a Web or other on-line portal) or through an application program interface (API).

An aspect of the billing platform system is to aggregate credit card experience (e.g., history over the period of time since starting to handle transaction) across its numerous customers or merchants. The merchant gives authorization for the billing platform system to handle its transactions and interface with its payment processor, or multiple payment processors the merchant uses. When handling transactions for a merchant, the billing platform system can store, save, or track information about the transactions the system handles. For example, this aggregated or history information can be stored in a database.

After tracking transactions for some time, the billing platform system will have a history of transactions for a particular merchant. Since the system works with a number of merchants and billing platforms, the billing platform system can aggregate this history information across merchants and payment processors. Then the system can use experience with a particular merchant, vendor, card holder, bank, payment processor, or other with a different merchant. This enhances the efficiency of decision making by the system, such as deciding whether to attempt a forced deposit.

In FIG. 15, the billing platform processes credit card transactions of merchants A 1502, B 1504, and C 1506. Over time, the billing platform will have a history of credit cards for transactions it has handled for each merchant. The billing platform aggregates the credit card transaction history of various merchants A, B, and C. The billing platform aggregates the history information (1513) to create credit card history database 1404.

Although three merchants are shown, there can be any number of merchants (e.g., two or more, 10 or more, 25, 50, 100, 100s, 1000s, 10,000, or more) that are aggregated together into the billing platform's history database. The information for these merchants may be associated with one or more different payment processor networks. For example, one merchant may use multiple payment processors. The billing platform will aggregate the information from these two or more payment processors together. Some merchants may use only one payment processor. Also a consumer with a credit card may be a customer of two or more merchants, so the credit card data may reside with different merchants and different payment processors.

The billing platform aggregates information across different merchants and across different payment processors. With this aggregated credit card history database 1404, the billing platform can improve its success when making decisions (logic 1228) on forced deposits (e.g., full deposit 946 in FIG. 12B), as well as processing of other transactions.

Each payment processor has its own API for interfacing with or accessing credit card transaction data. For example, Paymentech has its API, and Litle (Vantiv) has its API; these APIs are different from each other. The billing platform has appropriate API translation interfaces for accessing the data of the different payment processors. With the merchants' authorization, the billing platform can transact (e.g., electronically via a secured network) card transactions and stored by the in an aggregated database 1401. Using the APIs, the billing platform can create and continually update the credit card history database as new credit card transactions are processed through the payment processor.

In some implementations, history data may be available through the merchant (or payment processor) that include more recent information (e.g., last month, or last 3 months), as well as older information (e.g., last 24 months, last 36 months, last 60 months, or other time period). Then when a merchant becomes a customer of the billing platform, the billing platform can access more recent as well as older credit card data via the merchant. For recent customers, the billing platform may have access to historical information at the payment processor. Then the billing platform will be able make good decisions based on this historical information and not have to wait, for example, for one, three, or six months of collecting data before the customer sees the benefits of the billing platform techniques.

Some of the discussion in this application describes examples of operation of the system based on processing or identifying transaction based on credit card number or consumer. This is an example of the system performing fine grained tracking at the credit card or individual consumer level. Various implementations of the system operate and process at higher levels than the individual consumer level. For example, the system can operate or process based on groups (e.g., groupings of individuals) such as based on banks, vendors, or bank identification number (BIN). Therefore, although individuals are discussed, the system and techniques of the system can also be applied at higher levels such as at the banks, vendors, or bank identification number (BIN) level.

The information stored by the payment processors for the credit card transactions vary. Some examples of the fields that are available include: (1) merchant's customer identifier, (2) bank identification number (BIN), (3) e-mail addresses, (4) credit card numbers, (5) billing address, (6) shipping address, (7) Internet Protocol (IP) address, and (8) telephone numbers. The billing platform receives this information from the merchant; however, one or more of the fields may not be populated with information. For example, for on-line transactions, the credit card number and e-mail addresses are populated, while phone numbers might in comparison be sparsely populated.

In a specific implementation, the chargeback information of payment processors is stored in a table with the fields as described above. The billing platform system requests and receives this table for different merchants. During an import process, the system attempts to cross reference the information received from different merchants and from different payment processors.

As an example, when a merchant uses multiple payment processors, a technique is to use the merchant's customer identifier to determine information to be aggregated. The credit card number (or BIN) can be used to further verify that the same customer is involved. The history database will reflect this person is a relatively high chargeback risk. Then when this credit card number (or BIN) appears again for a possible forced deposit, billing platform logic 1228 will decline 1231 the transaction. Even if the same credit card number (or BIN) is not used, the system can recognize the same person is involved because the same e-mail address was used. The history information can be used to prevent forced deposits for the original merchant or for other merchants (which the high chargeback risk person (or BIN) started making transactions with for the first time).

One merchant is not allowed to see the confidential credit card transaction history of other merchants. But because the billing platform aggregates the credit card history of multiple merchants, other merchants gain the benefit of this aggregated history on their transactions. Overall the billing platform system with aggregated history and partial and forced deposits flow helps improve the speed and success rate of financial transactions in the financial system. From this increased velocity of transactions, the merchants have improved revenues and profits, and consumers have continued enjoyment of goods and services.

Part of the importing technique is to obscure the credit card number, so it is not directly stored the credit card history database. Rather the credit card number is hashed or otherwise obscured, but in a uniquely identifiable way. That way, if the history database were to be somehow accessed by an unauthorized person or lost (e.g., lost backup tapes or stolen laptop computer), there would be no credit card numbers. However, in the history database, the same hash code or hash value is used to identify each unique credit card. So, the logic of the system can determine when the same credit card number is being used, without using the actual credit card number. In the history database, although the term credit card number may be used, it should be understood that this may refer to an encoded, encrypted, hashed, or other unique identifier for the credit card number and not necessarily for the credit card number itself.

As an example, another import technique aggregates the transactions where the e-mail address (or other unique identifier) is the same. The billing platform system identifies these as being the same consumer (or other unique identifier), and aggregates the chargeback, fraud, and other transactions experience for this person, across different merchants and payment processors.

Generally, the import technique can aggregate data entries from the merchants for the different merchants based on one or more fields including (1) merchant's customer identifier, (2) bank identification number (BIN), (3) e-mail addresses, (4) credit card numbers, (5) billing address, (6) shipping address, (7) Internet Protocol (IP) address, and (8) telephone numbers. For example, a merchant's customer identifier can be used to perform an initial aggregation for a single merchant (that may use multiple payment processors). Then further aggregation is performed based on credit card numbers addresses across multiple merchants. Then further aggregation is performed based on e-mail addresses across multiple merchants. Aggregation can further continue using additional fields. Some of the less populated fields may not be used, such as telephone numbers.

The import technique is repeated to aggregate new credit card information when it becomes available. The technique can operate in a real-time or batch fashion. In real-time mode, the new data is aggregated in real-time as it is being received. In batch mode, the data received is stored in a holding database. And then the import technique executes during a servicing time period. During this time period, the system or certain components of the system may be unavailable for scheduled or periodic maintenance. The import routine takes the data from the holding database and aggregates the data using processing as described above. The result of the import technique is an updated credit card history database (1404) with additional entries.

Logic Processing

Logic 1228 of FIG. 12B uses the credit card history database to make decisions. The logic can make decisions based on a number of factors such as (1) merchant specific, (2) different merchants, (3) BIN level (e.g., which bank), and (4) card type (whether a credit card, debit card, or prepaid card), and combinations of these. Based on these factors and the history database, the logic will determine the action (e.g., attempt a forced deposit or not).

The credit card history database can include the number of chargebacks for particular consumers and credit card numbers. The information can also include the number of transactions a consumer has made, as related to the number of chargebacks. So, although a consumer may have a number of chargebacks that is high compared to other consumers. That consumer may have a very high number of transactions, such that the percentage of chargebacks may be less than other consumers.

The information can also include the time or recency of the chargebacks. For example, for a consumer, a number of chargebacks may have occurred 12 months ago, but in the last 3 months, there have been no chargebacks. This system can consider this consumer have become a better risk. In an implementation, the system can use moving average can be used to evaluate history database. The moving average can be the percentage or number of chargebacks in the last T number of weeks (days, months, years, or other time period), where T is 3 weeks, 4 weeks, 8 weeks, 12 weeks, or other value.

Then, for a consumer or a credit card (or BIN), when the chargeback number or percentage (C) is below a chargeback threshold (CT) for the last T time period, the system will try a forced deposit. When C is above CT for the last T time period, the system will decline attempting a forced deposit. If there a moving average is not used, then all time or the entire history is used. The CT value can be specified by the system administrator or by the merchant (e.g., a merchant specific factor). The CT value can be set to zero or very low value to prevent forced deposits altogether, or allow them only when there is a high confidence that they will be successful.

The specific merchant is a factor. For example, logic can vary (e.g., value of CT) depending on which merchant (or BIN) is being processed. For example, if a particular merchant has experienced many chargebacks more recently, the CT can be set to a lower value to prevent even more chargebacks from occurring. While for a merchant that has experienced fewer chargebacks recently, the value of CT can be set to a higher value in an attempt to increase the number transactions going through.

Different merchants can have different results for the same consumer (or BIN). For example, merchant A may have had too many chargebacks recently compared to merchant B. The system will attempt a forced deposit for a consumer C for merchant B, but decline for consumer C for merchant A. The chargebacks for merchant A may not have been caused by consumer C, but this does not matter to the billing platform system because it is trying to reduce the number or percentage of chargebacks.

The BIN or bank is a factor. Some banks do not allow captures without previous authorization. If such as bank is being processed, the logic will not do a forced deposit since the transaction will ultimately be rejected by the bank. Also forced deposits may be more likely or less likely to go through a particular bank. The logic can have an appropriate weighting for different banks, and this will result in the logic proceeding or not proceeding with attempting a forced deposit.

The type of card is a factor. For example, when the logic determines the card is a prepaid card (e.g., gift card with a certain value on it), a forced deposit (for an amount greater than the card amount) will not be attempted. This is because a prepaid card, unlike a credit card, has a definite value or limit which cannot be exceeded.

When the system determines a consumer or a BIN is not a good chargeback risk, this consumer or BIN can be put onto a black list 1306 (see FIG. 13). Then, the system checks whether the card or consumer or BIN is on the black list. If so, the forced deposit is not attempted and transaction does not need to process through 1308 and 1310. The discussion regarding the black list is also applicable to the white list, where a consumer is deemed a low chargeback risk and an attempted forced deposit is automatically approved.

When a consumer or BIN is on the black list, an implementation of the system can attempt to do a chargeback despite this. A technique of the system performs a continual validation of the black list, so that consumers on the black list can be removed. For example, the black list can include the consumer and a time M when this consumer was placed on the black list. The current time of the check of black list is N. If the time difference (N−M) is greater than a threshold value O, which can be set by a system administrator or the merchant, the system can attempt a forced deposit. If the forced deposit goes though, the consumer can be removed from the black list.

There can be continual validation for a black list for bad BINs too (e.g., 1308 in FIG. 13). If an outcome of a technical chargeback is a failure, the card may be placed in the bad bin black list. If an outcome of a technical chargeback is a success, the card is removed from the bad bin black list. In a specific implementation, the system can add a card to a bad BIN later; if it is determined to be good subsequently, the system can allow (or white list) the card again.

Generally the system performs a continual validation of the database, white list, and black list 1306, bad bin list 1308, and chargeback list 1310. Validation factors include (1) the total success, such as many successful transactions occurring or a relatively high percentage of successful transaction being successful. Another factor can be (2) the velocity of chargebacks (e.g., too many chargebacks occurring recently). Based on these factors, consumers and credit card numbers can be removed or placed on the appropriate list.

The above discussion regarding logic 1228 and processing of the flow in FIG. 13 is also applicable to the flow in FIG. 14 for attempting to save failed transaction.

Figure 16:
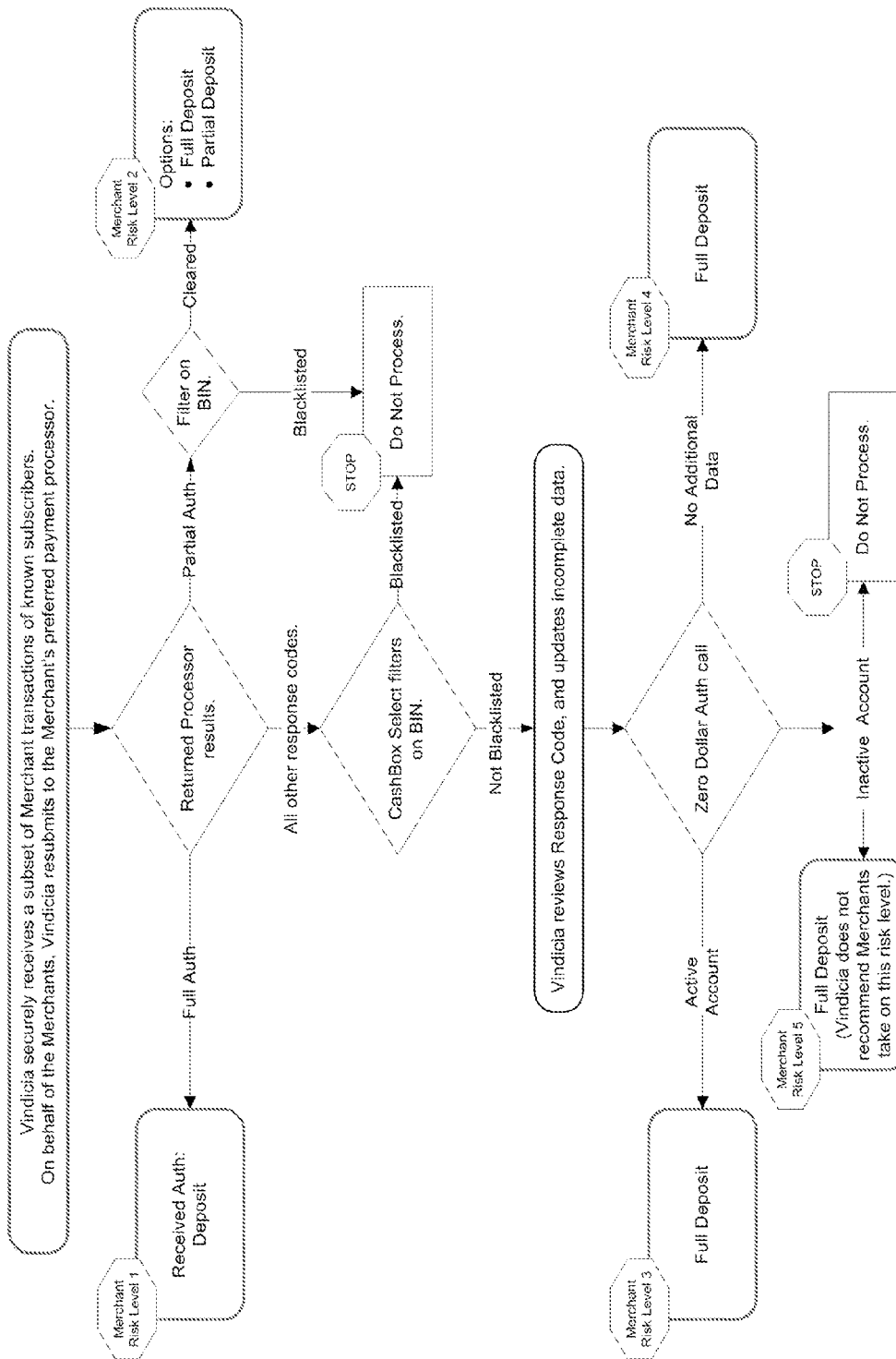
FIG. 16 shows flow for a zero dollar authorization flow.

FIG. 16 shows flow for a zero dollar authorization technique. This is a specific implementation of a Vindicia system for further processing merchant transactions. The system securely receives a subset of merchant transactions of knows subscribers. On behalf of the merchants, the system resubmits to the merchant's preferred payment processor. The merchant's transaction did not go through, and as discussed, the flows uses techniques as previously described to attempt to have the transaction go through.

The flow lists five merchant risk levels, from level 1 to level 5. Level 1 has minimal risk, which each succeeding level up to level 5 has an increasing amount of greater risk for the merchant, such as a greater risk of a chargeback occurring. The merchant can choose the risk level that is used during the processing of the transactions. For example, in a specific implementation, Vindicia does not recommend merchants use risk level 5 for the flow.

For merchant risk level 1, the system checks the returned processor results. The processor gives a full authorization response code. Then the system attempts a full deposit.

For merchant risk level 2, the processor gives a partial authorization response code. The system filters based on BIN. If the BIN is cleared, then the system attempts a full deposit or a partial deposit. If the BIN is on a blacklist, then the transaction is not processed.

For all other response codes, the system filters on the BIN. If the BIN is blacklisted, these are not processed. Those are not blacklisted, the system reviews the response code and update incomplete data.

For merchant risk level 3, the system attempts a zero dollar authorization call. The account is determined as an active account. Then, the system attempts a full deposit.

For merchant risk level 4, the system attempts a zero dollar authorization call. There is no additional data on the account. The system attempts a full deposit.

If account is determined as an inactive account. For merchant risk level 5, the system will attempt a full deposit. Otherwise, the transaction is not processed.

Figure 17:
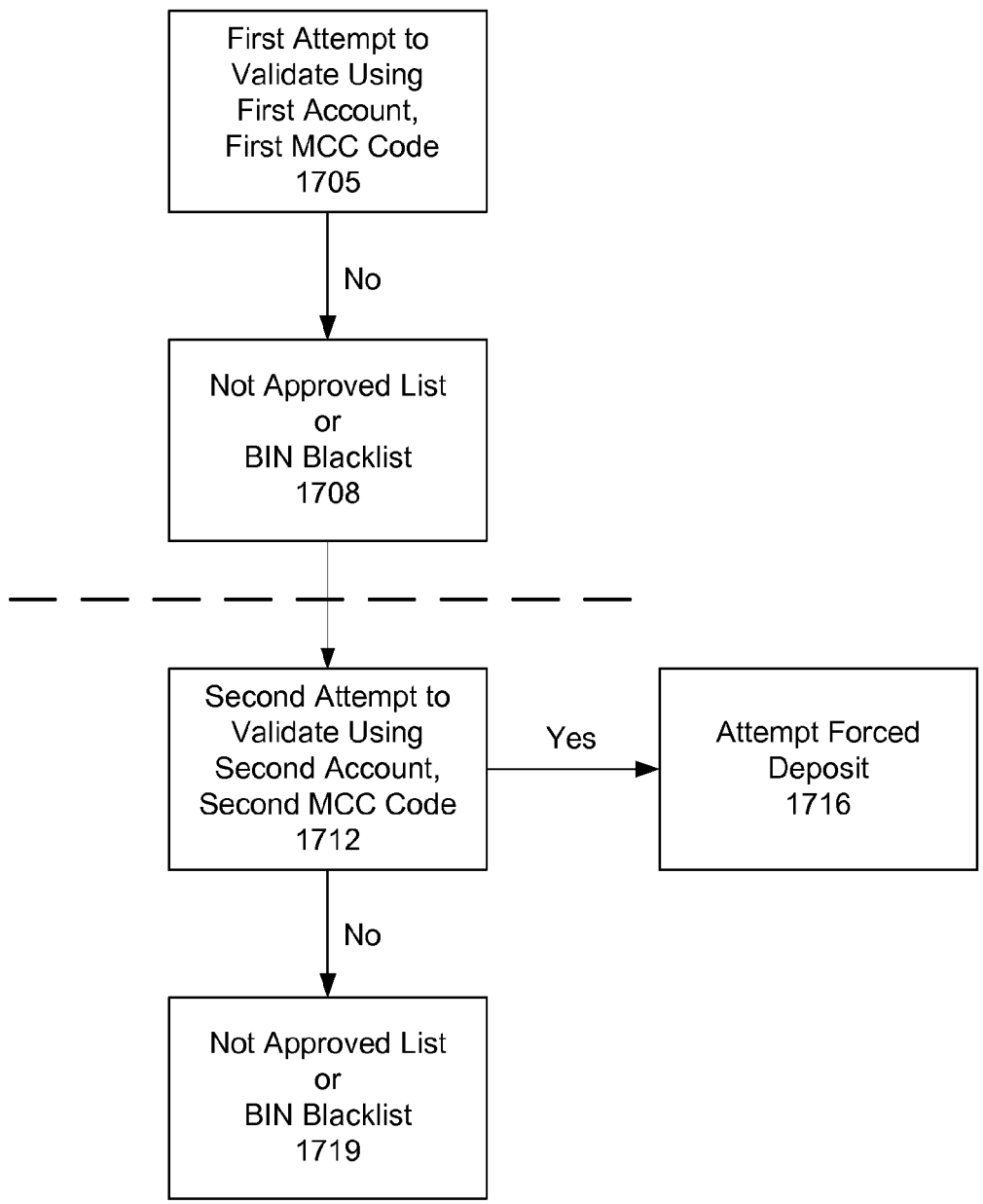
FIG. 17 shows flow for validating a transaction using multiple merchant category (MCC) codes.

FIG. 17 shows flow for validating a transaction using multiple merchant category (MCC) codes. A merchant category code (MCC) is a four-digit number assigned to a business by credit card companies (e.g., American Express, MasterCard, VISA) when the business accepts one of these cards as a form of payment. The MCC is used to classify the business by the type of goods or services it provides. In the United States, it can be used to determine if a payment needs to be reported to the Internal Revenue Service for tax purposes.

In a step 1705, a merchant can request a validation of a transaction through a payment processor, which is used to approve or reject the transaction. The payment processor performs the validation using the merchant's assigned MCC code (a first MCC code). The payment processor returns a response code (e.g., 100, 104, 302, or 530), indicating the transaction is approved or not approved. If approved the transaction is processed.

An appendix to this application includes a sample listing of credit card response reason codes for payment processor Chase Paymentech. This listing is an merely an example of some response codes, and the specific code numbers can be different depending on the payment processor. Other payment processors can have more codes or fewer codes than listed in the appendix.

If not approved, proceeding to step 1708, the response code can also indicate a why the transaction was not approved. The card or transaction can be checked against the BIN blacklist or other not approved (or approved list). If the card is not on such a "not approved" list, the transaction can be sent to a system for a second attempt to validate (step 1712).

Step 1712 is similar to step 1705, but validation of the transaction is performed using a different MCC code than in 1705. Because a different MCC is used, the validation results can be different. For example, this second response code (from step 1712) may be an approval, which is different from a rejection first response code received in 1705.

The second response code can be a not approved response, but using different number than received in 1705. For example, in 1705, a code of 530 may be received, while in 1712, a code of 104 is received. As a further example, in a first validation attempt, a first response code of 302 is received, while in a second validation attempt, a second response code of 104 is received.

The code received after second validation attempt using a second, different MCC code gives additional information on why a transaction was rejected. Thus, by performing two or more validation attempts using two or more different MCC codes, this provides additional information (e.g., additional research) on a risk level of a transaction. This can be used in conjunction with other techniques described in this application on approving transactions for an attempted forced deposit or zero dollar authorization flow.

In a step 1716, if the additional information represents acceptable risk to the merchant, the system can attempt a forced deposit. In a step 1719, the card or transaction can be checked against the BIN blacklist or other not approved (or approved list). If the card is on a "not approved" list, the system can stop further processing.

In this flow, steps 1705 and 1708 can be performed by the merchant (using a first MCC code) or other entity. Steps 1712 and 1719 can be performed by a second, different entity (using a second MCC code) than steps 1705 and 1708. The second entity can be a system such as described in this application (e.g., the Vindicia CashBox or CashBox Select system).

Although the flow shows a specific implementation of using two different MCC codes when validating. One having ordinary skill in the art recognized that any number of different MCC codes and validations can be used, such as 3, 4, 5, 6, or 7 or more. The greater number of MCC codes used for validations will give more information, but some of the response codes can duplicate of other validation attempts. So there will be diminishing value in making a very large number of validation attempts.

A reason for different response codes being returned for different MCC codes includes that each MCC code can have a different risk profile or threshold, which is taken into account by the payment processor.

Figure 18:
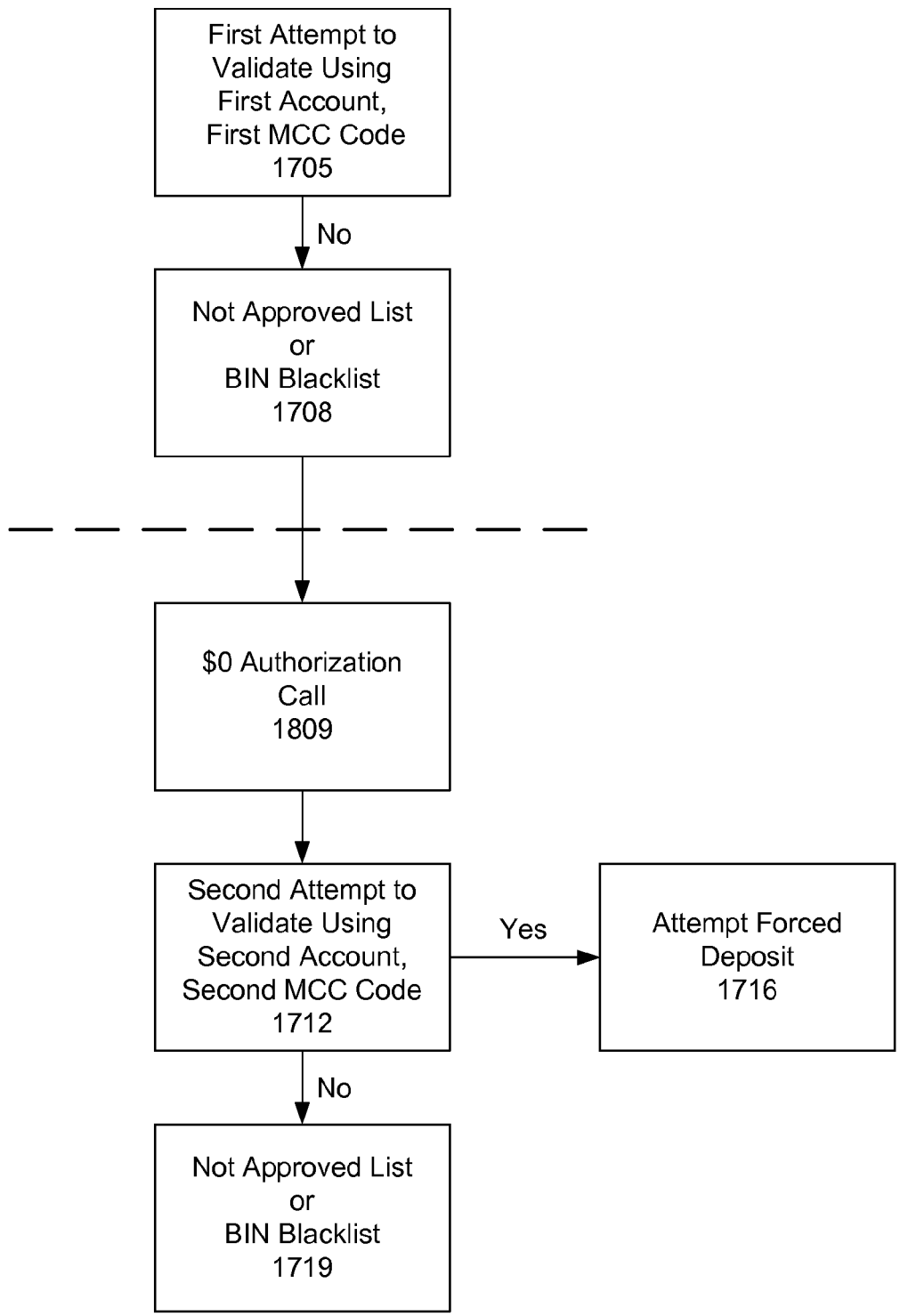
FIG. 18 shows another flow for validating a transaction using multiple MCC codes, including a zero dollar authorization technique.

FIG. 18 shows another flow for validating a transaction using multiple merchant category (MCC) codes. This flow is similar to the flow in FIG. 17, but incorporates the zero dollar authorization technique (step 1809) described in this invention. After the first validation attempt (1705), the zero dollar authorization technique (e.g., see FIG. 16) is attempted. If not successful, there can be a second validation attempt using a different MCC code.

Also, a second validation attempt using a different MCC code can be integrated within the zero dollar authorization or attempted force deposit flows described in this application. For example, for the FIG. 16 flow, after disapproval at a particular risk level (e.g., risk level 1, 2, 3, 4, or 5, or a combination of these), the second validation attempt using a different MCC can occur.

This description of the invention has been presented for the purposes of illustration and description. It is not intended to be exhaustive or to limit the invention to the precise form described, and many modifications and variations are possible in light of the teaching above. The embodiments were chosen and described in order to best explain the principles of the invention and its practical applications. This description will enable others skilled in the art to best utilize and practice the invention in various embodiments and with various modifications as are suited to a particular use. The scope of the invention is defined by the following claims.

The invention claimed is:

1. A method comprising:

receiving, by a billing platform, a payment request from a merchant for a payment using a payment card, wherein the payment request comprises a payment amount being charged in association with a transaction between a customer and the merchant for a good or service;

setting, by the billing platform, a partial authorization flag and sending, by the billing platform, an authorization request to a payment processor for the payment amount;

responsive to the authorization request, receiving, by the billing platform, a partial authorization for an authorized amount which is less than the payment amount;

using at least one electronic processor to determine, by the billing platform, if the authorized amount is greater than an X percent of the payment amount, the X percent being predefined by the merchant and being less than 100 percent of the payment amount;

when the authorized amount is greater than the X percent of the payment amount but less than the payment amount, requesting, by the billing platform on behalf of the merchant, a deposit for the authorized amount, where the authorized amount is accepted by the merchant for completing the transaction in lieu of an entirety of the payment amount;

when the authorized amount is less than the X percent of the payment amount, determining whether the card is a prepaid card, and (a) when it is determined that the card is a prepaid card, declining, by the billing platform, the transaction, and (b) when it is determined that the card is not a prepaid card, determining, by the billing platform, whether the authorized amount is greater than a Y percent of the payment amount, the Y percent being predefined and being less than the X percent, and
  (1) when the authorized amount is greater than the Y percent of the payment amount, requesting, by the billing platform, a deposit for the entirety of the payment amount; and
  (2) when the authorized amount is not greater than the Y percent of the payment amount, declining, by the billing platform, the transaction.

2. The method of claim 1, further comprising:
providing a graphical user interface screen for the merchant to specify the X percent.

3. The method of claim 1, wherein declining the transaction comprises returning a declined result by the billing platform to the merchant.

* * * * *